United States Patent
Kim et al.

(10) Patent No.: US 12,482,398 B2
(45) Date of Patent: Nov. 25, 2025

(54) IMAGE DISPLAY APPARATUS

(71) Applicant: LG ELECTRONICS INC., Seoul (KR)

(72) Inventors: Dohoon Kim, Seoul (KR); Jinhaeng Jang, Seoul (KR); Kanghyun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/580,899

(22) PCT Filed: Jul. 21, 2021

(86) PCT No.: PCT/KR2021/009436
§ 371 (c)(1),
(2) Date: Jan. 19, 2024

(87) PCT Pub. No.: WO2023/003055
PCT Pub. Date: Jan. 26, 2023

(65) Prior Publication Data
US 2024/0371318 A1 Nov. 7, 2024

(51) Int. Cl.
*G09G 3/20* (2006.01)
*G09G 3/3208* (2016.01)
(Continued)

(52) U.S. Cl.
CPC ......... *G09G 3/2092* (2013.01); *G09G 3/3208* (2013.01); *G09G 3/36* (2013.01);
(Continued)

(58) Field of Classification Search
CPC .... G09G 3/3208; G09G 3/36; G09G 2330/02; G09G 2330/028; G09G 2330/04;
(Continued)

(56) References Cited

U.S. PATENT DOCUMENTS

| 2012/0234471 A1* | 9/2012 | Guenard | G09F 3/10 |
| | | | 156/182 |
| 2014/0092644 A1 | 4/2014 | Kawasumi | |
| 2021/0234471 A1* | 7/2021 | Qiu | H02M 1/10 |

FOREIGN PATENT DOCUMENTS

| JP | 2018201336 A * 12/2018 |
| KR | 10-0984813 B1   10/2010 |

(Continued)

*Primary Examiner* — Adam R. Giesy
(74) *Attorney, Agent, or Firm* — Birch, Stewart, Kolasch & Birch, LLP

(57) ABSTRACT

An image display apparatus is disclosed. The image display apparatus according to an embodiment of the present disclosure includes: a display; and a power supply to supply a driving voltage to the display, wherein the power supply includes: an AC/DC converter comprising at least one switching device and configured to convert an input AC voltage into a DC voltage and output the DC voltage to a dc link; a dc link capacitor disposed at the dc link; an input voltage detector to detect the input AC voltage; a dc link voltage detector to detect a dc link voltage; and a controller to control the AC/DC converter, wherein in response to the detected input AC voltage exceeding a first reference value and the detected dc link voltage being lower than or equal to a second reference value lower than the first reference value, the controller is configured to turn off the switching device in the AC/DC converter. Accordingly, burnout of the dc link capacitor may be prevented.

15 Claims, 25 Drawing Sheets

(51) Int. Cl.
    *G09G 3/36*          (2006.01)
    *H02H 7/125*       (2006.01)
    *H02M 1/00*        (2006.01)
    *H02M 7/217*      (2006.01)

(52) U.S. Cl.
    CPC .......... *H02H 7/125* (2013.01); *H02M 1/0085* (2021.05); *H02M 7/217* (2013.01); *G09G 2330/02* (2013.01); *G09G 2330/028* (2013.01); *G09G 2330/04* (2013.01)

(58) Field of Classification Search
    CPC ..... G09G 3/2092; H02H 7/125; H02M 7/217; H02M 1/0085
    See application file for complete search history.

(56) References Cited

FOREIGN PATENT DOCUMENTS

| | | |
|---|---|---|
| KR | 10-2019-0064828 A | 6/2019 |
| KR | 10-2019-0129466 A | 11/2019 |

\* cited by examiner (a)

(b)

(a)

(b)

IMAGE DISPLAY APPARATUS

CROSS REFERENCE TO RELATED APPLICATIONS

This application is the National Phase of PCT International Application No. PCT/KR2021/009436, filed on Jul. 21, 2021, all of which is hereby expressly incorporated by reference into the present application.

BACKGROUND

1. Field

The present disclosure relates to an image display apparatus, and more particularly to an image display apparatus capable of preventing burnout of a dc link capacitor.

2. Description of the Related Art

An image display apparatus is an apparatus that displays an image.

In response to recent demand for increasing resolution and definition of an image, the resolution of a display in an image display apparatus has been increased.

For example, the resolution of the display has been increased to 2K, 4K, 8K, and 16K.

Meanwhile, as the resolution of the display is increased, power consumption of the display is also increased.

Meanwhile, as power consumption increases, the possibility of burnout of a capacitor in a power supply also increases.

SUMMARY

It is an object of the present disclosure to provide an image display apparatus capable of preventing burnout of a dc link capacitor.

It is another object of the present disclosure to provide an image display apparatus capable of preventing burnout of a dc link capacitor resulting from a continuous increase in dc link voltage due to a dc link voltage detection error.

In order to achieve the above and other object, an image display apparatus according to an embodiment of the present disclosure includes: a display; and a power supply configured to supply a driving voltage to the display, wherein the power supply includes: an AC/DC converter comprising at least one switching device and configured to convert an input AC voltage into a DC voltage and output the DC voltage to a dc link; a dc link capacitor disposed at the dc link; an input voltage detector configured to detect the input AC voltage; a dc link voltage detector configured to detect a dc link voltage at the dc link; and a controller configured to control the AC/DC converter, wherein in response to the detected input AC voltage exceeding a first reference value and the detected dc link voltage being lower than or equal to a second reference value, which is lower than the first reference value, the controller is configured to turn off the switching device in the AC/DC converter.

Meanwhile, in response to the detected input AC voltage exceeding the first reference value and the detected dc link voltage exceeding the second reference value, the controller may be configured to perform a switching operation of the switching device in the AC/DC converter.

Meanwhile, in response to the detected input AC voltage being lower than or equal to the first reference value, the controller may be configured to turn off the switching device in the AC/DC converter.

Meanwhile, after being powered on and before operation of the switching device in the AC/DC converter, the controller may be configured to determine whether the detected dc link voltage is lower than or equal to the second reference value, and in response to the detected dc link voltage being lower than or equal to the second reference value, the controller may be configured to stop the AC/DC converter.

Meanwhile, after being powered on and before operation of the switching device in the AC/DC converter, the controller may be configured to determine whether the detected input AC voltage is lower than or equal to the first reference value, and when the detected input AC voltage is lower than or equal to the first reference value, the controller may be configured to stop the AC/DC converter.

Meanwhile, the AC/DC converter may include: a first leg including a first diode and a first switching device which are connected in series to each other; and a second leg including a second diode and a second switching device which are connected in series to each other and connected in parallel to the first leg.

Meanwhile, after being powered on and before operation of the first switching device and the second switching device, the controller may be configured to determine whether the detected dc link voltage is lower than or equal to the second reference value, and when the detected dc link voltage is lower than or equal to the second reference value, the controller may be configured to stop the AC/DC converter.

Meanwhile, the input voltage detector may include: a first resistor having one end connected between the input AC voltage and the AC/DC converter; and a second resistor having one end connected to another end of the first resistor, and having another end connected to a ground terminal, wherein a voltage at both ends of the second resistor may be input to the controller.

Meanwhile, the dc link voltage detector may include: a third resistor having one end connected to one end of the dc link; a fourth resistor having one end connected to another end of the third resistor, and having another end connected to a ground terminal; and a capacitor connected in parallel to both ends of the fourth resistor, wherein a voltage at both ends of the fourth resistor may be input to the controller.

Meanwhile, when the dc link voltage continuously increases in a state in which a voltage detected by the dc link voltage detector is lower than or equal to the second reference value, the controller may be configured to decrease the dc link voltage by turning off the AC/DC converter.

Meanwhile, in response to a voltage detected by the dc link voltage detector exceeding the second reference value, the controller may be configured to increase the dc link voltage to a target voltage, and after the dc link voltage reaches the target voltage, the controller may be configured to control the dc link voltage to maintain the target voltage.

Meanwhile, the power supply may further include: a first DC/DC converter configured to convert a level of the dc link voltage and to supply the dc link voltage having the converted level to the controller; and a second DC/DC converter configured to convert a level of the dc link voltage and supply the driving voltage to the display.

Meanwhile, the display may include a liquid crystal panel.

Meanwhile, the display may include an organic light emitting diode panel.

An image display apparatus according to another embodiment of the present disclosure includes: a display; and a power supply configured to supply a driving voltage to the display, wherein the power supply includes: an AC/DC converter comprising at least one switching device and configured to convert an input AC voltage into a DC voltage and output the DC voltage to a dc link; a dc link capacitor disposed at the dc link; a dc link voltage detector configured to detect a dc link voltage at the dc link; and a controller configured to control the AC/DC converter, wherein after being powered on and before operation of the switching device in the AC/DC converter, the controller is configured to determine whether the detected dc link voltage is lower than or equal to a reference value, and when the detected dc link voltage is lower than or equal to the reference value, the controller is configured to stop the AC/DC converter.

Meanwhile, when the dc link voltage continuously increases in a state that a voltage detected by the dc link voltage detector is lower than or equal to the reference value, the controller may be configured to decrease the dc link voltage by turning off the AC/DC converter.

Meanwhile, in response to a voltage detected by the dc link voltage detector exceeding the reference value, the controller may be configured to increase the dc link voltage to a target voltage, and after the dc link voltage reaches the target voltage, the controller may be configured to control the dc link voltage to maintain the target voltage.

Effects of the Disclosure

An image display apparatus according to an embodiment of the present disclosure includes: a display; and a power supply configured to supply a driving voltage to the display, wherein the power supply includes: an AC/DC converter comprising at least one switching device and configured to convert an input AC voltage into a DC voltage and output the DC voltage to a dc link; a dc link capacitor disposed at the dc link; an input voltage detector configured to detect the input AC voltage; a dc link voltage detector configured to detect a dc link voltage at the dc link; and a controller configured to control the AC/DC converter, wherein in response to the detected input AC voltage exceeding a first reference value and the detected dc link voltage being lower than or equal to a second reference value, which is lower than the first reference value, the controller is configured to turn off the switching device in the AC/DC converter. Accordingly, burnout of a dc link capacitor may be prevented. Particularly, it is possible to prevent burnout of the dc link capacitor resulting from a continuous increase in dc link voltage due to an error in detection of the dc link voltage.

Meanwhile, in response to the detected input AC voltage exceeding the first reference value and the detected dc link voltage exceeding the second reference value, the controller may be configured to perform a switching operation of the switching device in the AC/DC converter. Accordingly, burnout of a dc link capacitor may be prevented.

Meanwhile, in response to the detected input AC voltage being lower than or equal to the first reference value, the controller may be configured to turn off the switching device in the AC/DC converter. Accordingly, burnout of a dc link capacitor may be prevented.

Meanwhile, after being powered on and before operation of the switching device in the AC/DC converter, the controller may be configured to determine whether the detected dc link voltage is lower than or equal to the second reference value, and in response to the detected dc link voltage being lower than or equal to the second reference value, the controller may be configured to stop the AC/DC converter. Accordingly, burnout of a dc link capacitor may be prevented.

Meanwhile, after being powered on and before operation of the switching device in the AC/DC converter, the controller may be configured to determine whether the detected input AC voltage is lower than or equal to the first reference value, and when the detected input AC voltage is lower than or equal to the first reference value, the controller may be configured to stop the AC/DC converter. Accordingly, burnout of a dc link capacitor may be prevented.

Meanwhile, the AC/DC converter may include: a first leg including a first diode and a first switching device which are connected in series to each other; and a second leg including a second diode and a second switching device which are connected in series to each other and connected in parallel to the first leg. Accordingly, burnout of a dc link capacitor may be prevented.

Meanwhile, after being powered on and before operation of the first switching device and the second switching device, the controller may be configured to determine whether the detected dc link voltage is lower than or equal to the second reference value, and when the detected dc link voltage is lower than or equal to the second reference value, the controller may be configured to stop the AC/DC converter. Accordingly, burnout of a dc link capacitor may be prevented.

Meanwhile, the input voltage detector may include: a first resistor having one end connected between the input AC voltage and the AC/DC converter; and a second resistor having one end connected to another end of the first resistor, and having another end connected to a ground terminal, wherein a voltage at both ends of the second resistor may be input to the controller. Accordingly, the controller may operate based on the detected input AC voltage.

Meanwhile, the dc link voltage detector may include: a third resistor having one end connected to one end of the dc link; a fourth resistor having one end connected to another end of the third resistor, and having another end connected to a ground terminal; and a capacitor connected in parallel to both ends of the fourth resistor, wherein a voltage at both ends of the fourth resistor may be input to the controller. Accordingly, the controller may operate based on the detected input AC voltage.

Meanwhile, when the dc link voltage continuously increases in a state in which a voltage detected by the dc link voltage detector is lower than or equal to the second reference value, the controller may be configured to decrease the dc link voltage by turning off the AC/DC converter. Accordingly, burnout of a dc link capacitor may be prevented.

Meanwhile, in response to a voltage detected by the dc link voltage detector exceeding the second reference value, the controller may be configured to increase the dc link voltage to a target voltage, and after the dc link voltage reaches the target voltage, the controller may be configured to control the dc link voltage to maintain the target voltage. Accordingly, the dc link voltage may be stably maintained at the target voltage.

Meanwhile, the power supply may further include: a first DC/DC converter configured to convert a level of the dc link voltage and to supply the dc link voltage having the converted level to the controller; and a second DC/DC converter configured to convert a level of the dc link voltage and supply the driving voltage to the display. Accordingly, various voltages may be output.

Meanwhile, the display may include a liquid crystal panel. Accordingly, it is possible to prevent burnout of the dc link capacitor in the power supply that supplies driving power to the liquid crystal panel.

Meanwhile, the display may include an organic light emitting diode panel. Accordingly, it is possible to prevent burnout of the dc link capacitor in the power supply that supplies driving power to the organic light emitting diode panel.

An image display apparatus according to another embodiment of the present disclosure includes: a display; and a power supply configured to supply a driving voltage to the display, wherein the power supply includes: an AC/DC converter comprising at least one switching device and configured to convert an input AC voltage into a DC voltage and output the DC voltage to a dc link; a dc link capacitor disposed at the dc link; a dc link voltage detector configured to detect a dc link voltage at the dc link; and a controller configured to control the AC/DC converter, wherein after being powered on and before operation of the switching device in the AC/DC converter, the controller is configured to determine whether the detected dc link voltage is lower than or equal to a reference value, and when the detected dc link voltage is lower than or equal to the reference value, the controller is configured to stop the AC/DC converter. Accordingly, burnout of the dc link capacitor in the power supply may be prevented.

Meanwhile, when the dc link voltage continuously increases in a state that a voltage detected by the dc link voltage detector is lower than or equal to the reference value, the controller may be configured to decrease the dc link voltage by turning off the AC/DC converter. Accordingly, burnout of the dc link capacitor in the power supply may be prevented.

Meanwhile, in response to a voltage detected by the dc link voltage detector exceeding the reference value, the controller may be configured to increase the dc link voltage to a target voltage, and after the dc link voltage reaches the target voltage, the controller may be configured to control the dc link voltage to maintain the target voltage. Accordingly, the dc link voltage may be stably maintained at the target voltage.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
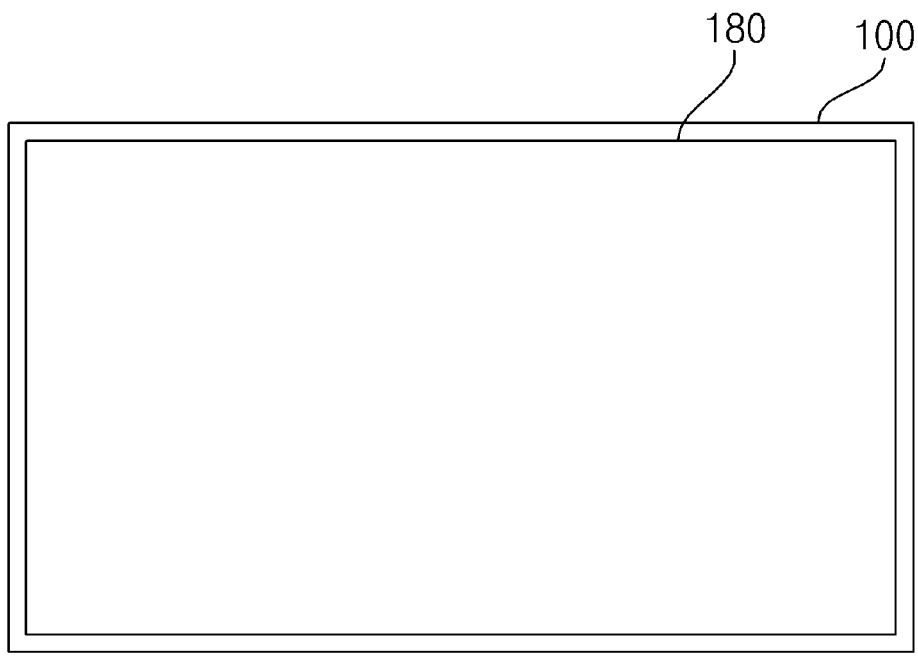
FIG. 1 is a diagram showing an image display apparatus according to an embodiment of the present disclosure.

FIG. 1 is a diagram showing an image display apparatus according to an embodiment of the present disclosure.

Referring to the figure, the image display apparatus 100 may include a display 180.

The resolution of the display 180 has been increased to 2K, 4K, 8K, and 16K. As a result, power consumption of the display 180 is also increased.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

The liquid crystal display panel may further require a separate backlight in addition to a panel configured to display an image.

In the image display apparatus 100 according to an embodiment of the present disclosure, when a dc link voltage Vdc, detected in an AC/DC converter 700 (see FIG. 9) that supplies power to a liquid crystal panel in the display 180, is lower than or equal to a reference value Vref2, the image display apparatus 100 may control switching devices in the AC/DC converter 700 to be turned off. Accordingly, burnout of a dc link capacitor Ca (see FIG. 9A) may be prevented. Particularly, it is possible to prevent burnout of the dc link capacitor Ca resulting from a continuous increase in dc link voltage Vdc due to an error in detection of the dc link voltage Vdc.

Meanwhile, the organic light emitting diode panel or the inorganic light emitting diode panel requires no separate backlight in order to display an image.

In the image display apparatus 100 according to an embodiment of the present disclosure, when a dc link voltage Vdc, detected in an AC/DC converter 700 (see FIG. 9) that supplies power to the organic light emitting diode panel or the inorganic light emitting diode panel in the display 180, is lower than or equal to a reference value Vref2, the image display apparatus 100 may control switching devices in the AC/DC converter 700 to be turned off.

Accordingly, burnout of the dc link capacitor Ca (see FIG. 9A) may be prevented. Particularly, it is possible to prevent burnout of the dc link capacitor Ca resulting from a continuous increase in dc link voltage Vdc due to an error in detection of the dc link voltage Vdc.

Meanwhile, the image display apparatus 100 in FIG. 1 may be a TV, a monitor, a tablet PC, a mobile terminal, etc.

Figure 2:
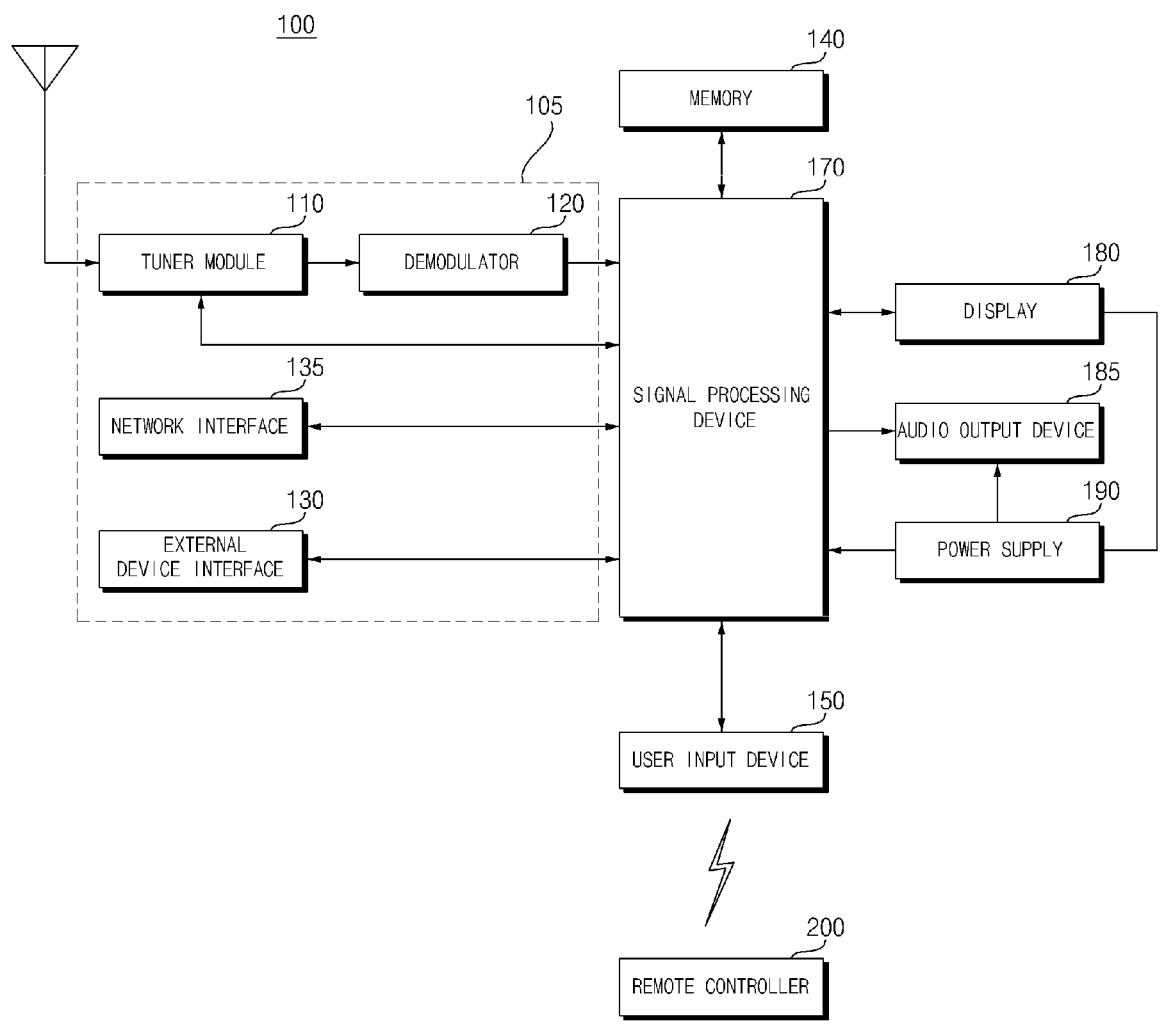
FIG. 2 is an example of an internal block diagram of the image display apparatus of FIG. 1.

FIG. 2 is an example of an internal block diagram of the image display apparatus of FIG. 1.

Referring to FIG. 2, an image display apparatus 100 according to an embodiment of the present disclosure includes an image receiver 105, an external device interface 130, a memory 140, a user input device 150, a sensor device (not shown), a signal processing device 170, a display 180, and an audio output device 185.

The image receiver 105 may include a tuner module 110, a demodulator 120, a network interface 135, and an external device interface 130.

Meanwhile, unlike the drawing, the image receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, when the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 can process a digital broadcast signal or an analog broadcast signal. The analog baseband image or audio signal (CVBS/SIF) output from the tuner module 110 may be directly input to the signal processing device 170.

Meanwhile, the tuner module 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external device interface 130 may transmit or receive data with a connected external device (not shown), e.g., a set-top box 50. To this end, the external device interface 130 may include an A/V input and output device (not shown).

The external device interface 130 may be connected in wired or wirelessly to an external device such as a digital versatile disk (DVD), a Blu ray, a game equipment, a camera, a camcorder, a computer(note book), and a set-top box, and may perform an input/output operation with an external device.

The A/V input and output device may receive image and audio signals from an external device. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processing device 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the signal processing device 170, the scope of the present disclosure is not limited thereto. The memory 140 may be included in the signal processing device 170.

The user input device 150 transmits a signal input by the user to the signal processing device 170 or transmits a signal from the signal processing device 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner module 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and performs signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may include a demultiplexer, an video processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner module 110 to control the tuning of the RF broadcast corresponding to the channel selected by the user or the previously stored channel.

In addition, the signal processing device 170 may control the image display apparatus 100 according to a user command input through the user input device 150 or an internal program. Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processing device 170, an image signal, a data signal, a control signal, and the like received from the external device interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include an AC/DC converter configured to convert an AC voltage into a DC voltage, and a DC/DC converter configured to convert the level of the DC voltage.

The remote controller 200 transmits the user input to the user input device 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input device 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
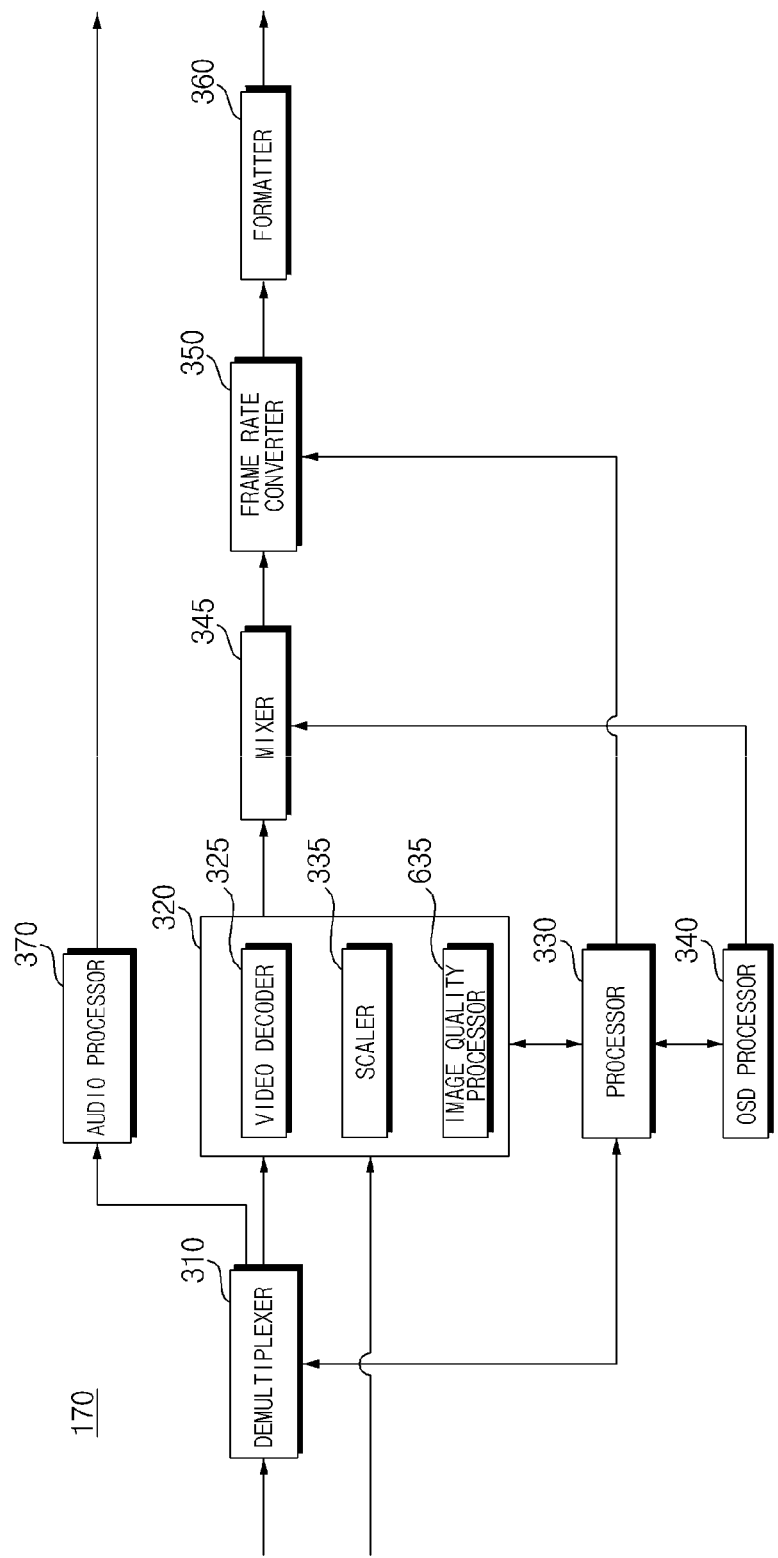
FIG. 3 is an example of an internal block diagram of a signal processing device of FIG. 2.

FIG. 3 is an example of an internal block diagram of the signal processing device of FIG. 2.

Referring to the figure, a signal processing device 170 according to an embodiment of the present disclosure may include a demultiplexer 310, a video processor 320, a processor 330, and an audio processor 370. In addition, the signal processing device 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner module 110, the demodulator 120, or the external device interface 130.

The video processor 320 may perform signal processing on an input image. For example, the video processor 320 may perform image processing on an image signal demultiplexed by the demultiplexer 310.

To this end, the video processor 320 may include an video decoder 325, a scaler 335, an image quality processor 635, an video encoder (not shown), an OSD processor 340, a frame rate converter 350, a formatter 360, etc.

The video decoder 325 decodes a demultiplexed image signal, and the scaler 335 performs scaling so that the resolution of the decoded image signal can be output from the display 180.

The video decoder 325 can include a decoder of various standards. For example, a 3D video decoder for MPEG-2, H.264 decoder, a color image, and a depth image, and a decoder for a multiple view image may be provided.

The scaler 335 may scale an input image signal decoded by the video decoder 325 or the like.

For example, when the size or resolution of an input image signal is small, the scaler 335 may upscale the input image signal, and, when the size or resolution of the input image signal is great, the scaler 335 may downscale the input image signal.

The image quality processor 635 may perform image quality processing on an input image signal decoded by the video decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert the frame rate of an input image. Meanwhile, the frame rate converter 350 can also directly output the frame rate without any additional frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processing device 170.

For example, the processor 330 may control the tuner module 110 to control the tuning of an RF broadcast corresponding to a channel selected by a user or a previously stored channel.

In addition, the processor 330 may control the image display apparatus 100 according to a user command input through the user input device 150 or an internal program.

In addition, the processor 330 may control data transmission to the network interface 135 or to the external device interface 130.

In addition, the processor 330 may control the operation of the demultiplexer 310, the video processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the video processor 320.

Figure 4A:
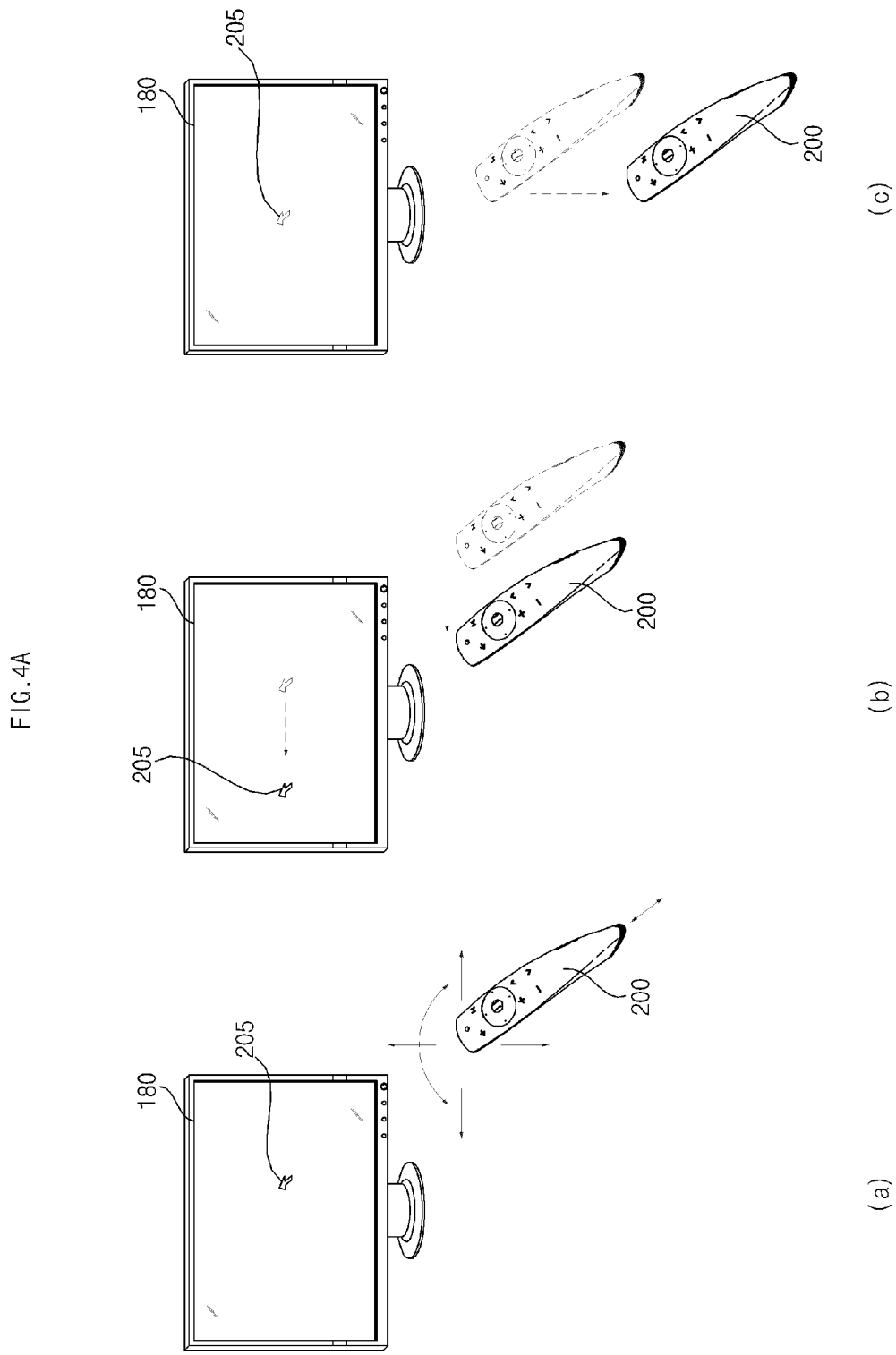
FIG. 4A is a diagram showing a control method of a remote controller of FIG. 2.

FIG. 4A is a diagram illustrating a control method of the remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200.

The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be decreased.

Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
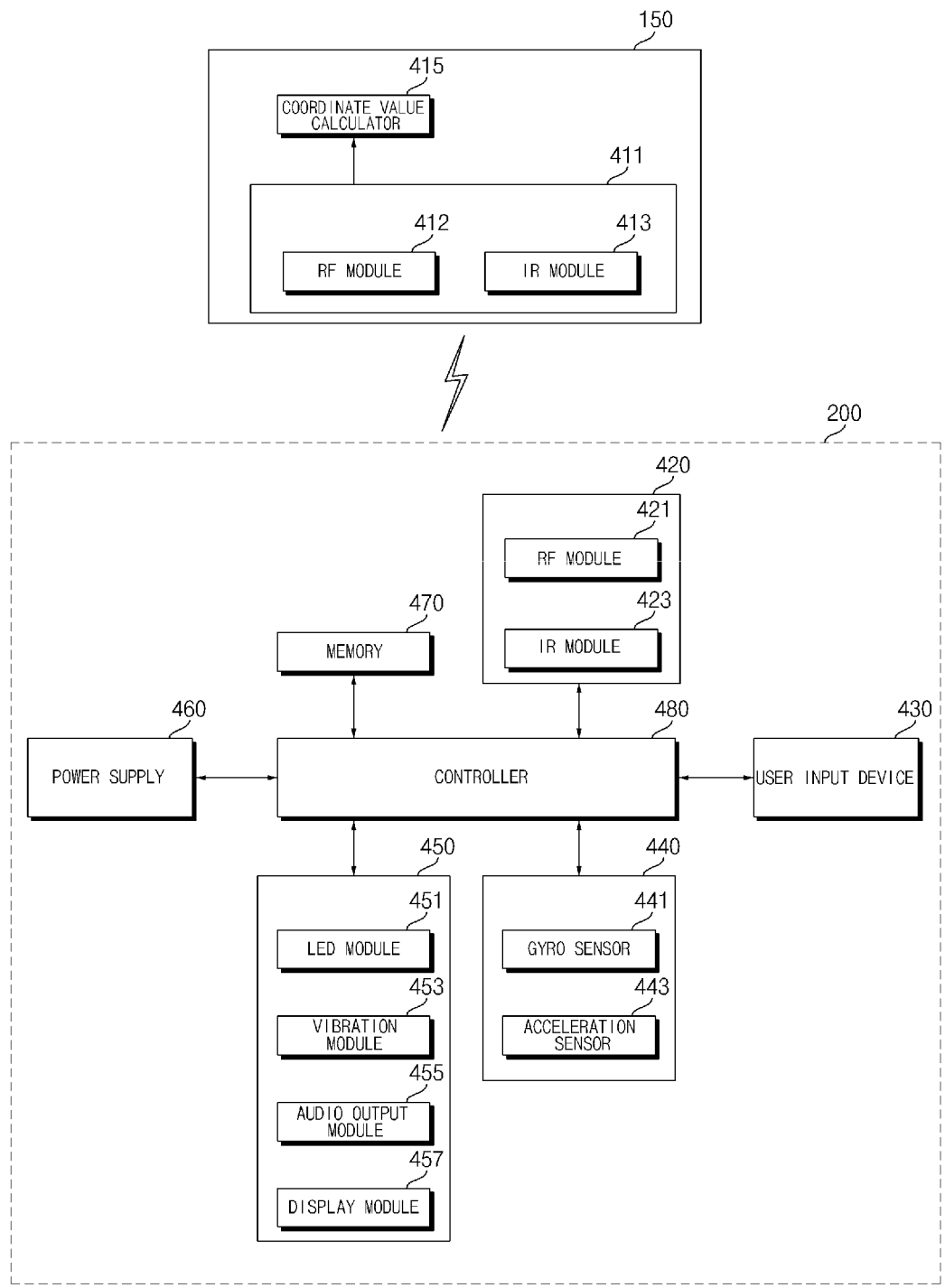
FIG. 4B is an internal block diagram of the remote controller of FIG. 2.

FIG. 4B is an internal block diagram of the remote controller of FIG. 2.

Referring to the figure, the remote controller 200 includes a wireless communicator 425, a user input device 435, a sensor device 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, when necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless communicator 425.

The user input device 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input device 150 may wirelessly transmit and receive a signal to and from the remote controller 200 through the RF module 412. In addition, the user input device 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input device 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input device 150 of the image display apparatus 100. In this case, the user input device 150 of the image display apparatus 100 may transmit information on the received pointer coordinate value to the controller 180 without a separate correction process of hand shake or error.

For another example, unlike the drawing, the coordinate value calculator 415 may be provided in the signal processing device 170, not in the user input device 150.

Figure 5:
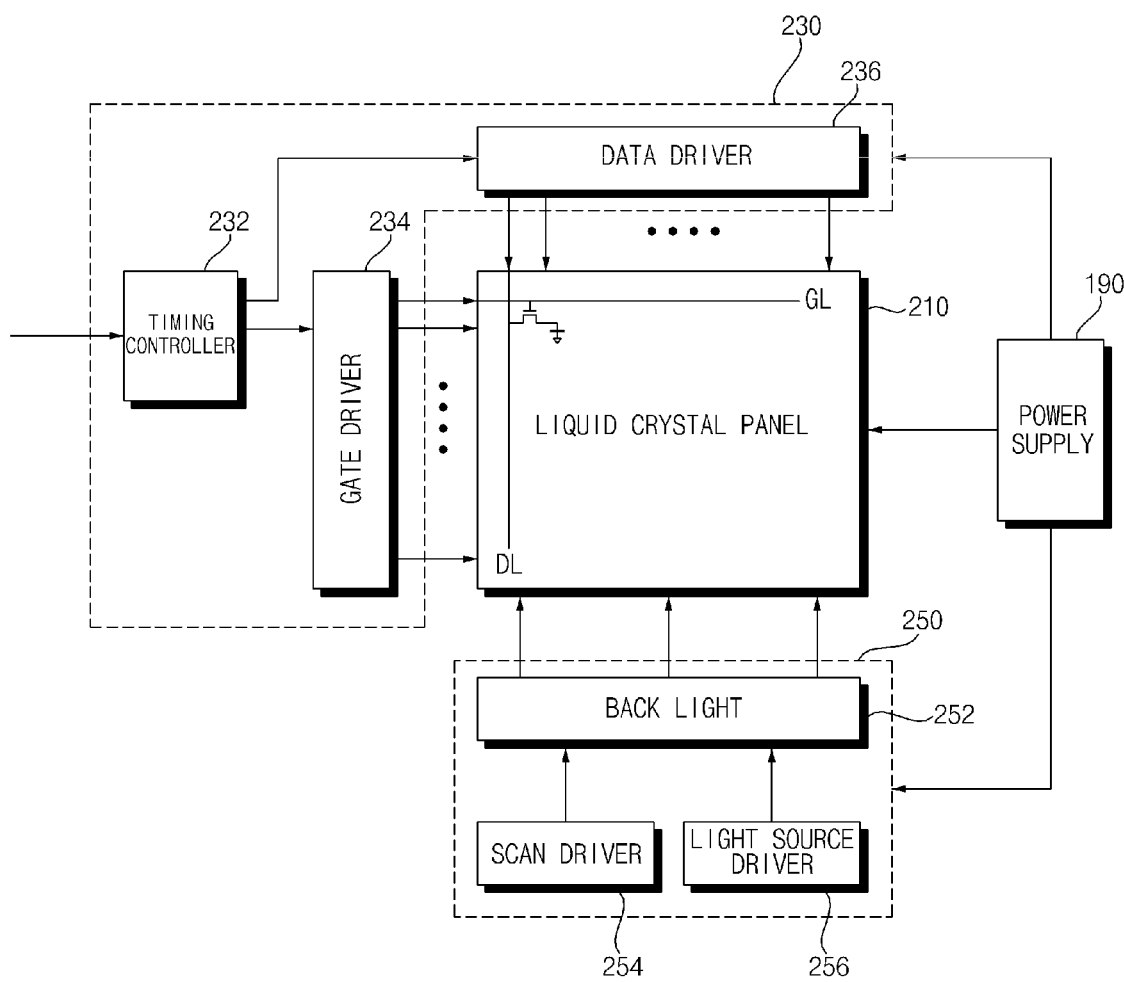
FIG. 5 is an example of an internal block diagram of a display of FIG. 2.

FIG. 5 is an example of an internal block diagram of the display of FIG. 2.

Referring to the figure, a liquid crystal display panel (LCD panel)-based display 180 may include a liquid crystal panel 210, a driving circuit 230, and a backlight device 250.

The liquid crystal panel 210 includes a first substrate in which a plurality of gate lines GL and a plurality of data lines DL are disposed so as to intersect each other in a matrix form and a thin film transistor and a pixel electrode connected thereto are formed at each intersection, a second substrate having a common electrode, and a liquid crystal layer formed between the first substrate and the second substrate.

The driving circuit 230 drives the liquid crystal panel 210 based on a control signal and a data signal supplied from a second controller 175 of FIG. 2. To this end, the driving circuit 230 includes a timing controller 232, a gate driver 234, and a data driver 236.

Upon receiving a control signal, RGB data signals, and a vertical synchronization signal Vsync from the second controller 175, the timing controller 232 controls the gate driver 234 and the data driver 236 in response to the control signal, relocates the RGB data signals, and provides the relocated RGB data signals to the data driver 236.

Under control of and the timing controller 232, the gate driver 234 and the data driver 236 supply a scanning signal and an image signal to the liquid crystal panel 210 via the gate lines GL and the data line DL.

The backlight device 250 supplies light to the liquid crystal panel 210. To this end, the backlight device 250 may include a backlight 252 including a plurality of light sources, a scan driver 254 configured to control scanning driving of the backlight 252, and a light source driver 256 configured to turn the backlight 252 on/off.

A predetermined image is displayed using light emitted from the backlight device 250 in the state in which light transmittance of the liquid crystal layer is adjusted due to an electric field formed between the pixel electrodes of the liquid crystal panel 210 and the common electrode.

The power supply 190 may supply common electrode voltage Vcom to the liquid crystal panel 210 and may supply gamma voltage to the data driver 236. In addition, the power supply 190 may supply driving voltage for driving the backlight 252 to the backlight device 250.

Figure 6A:
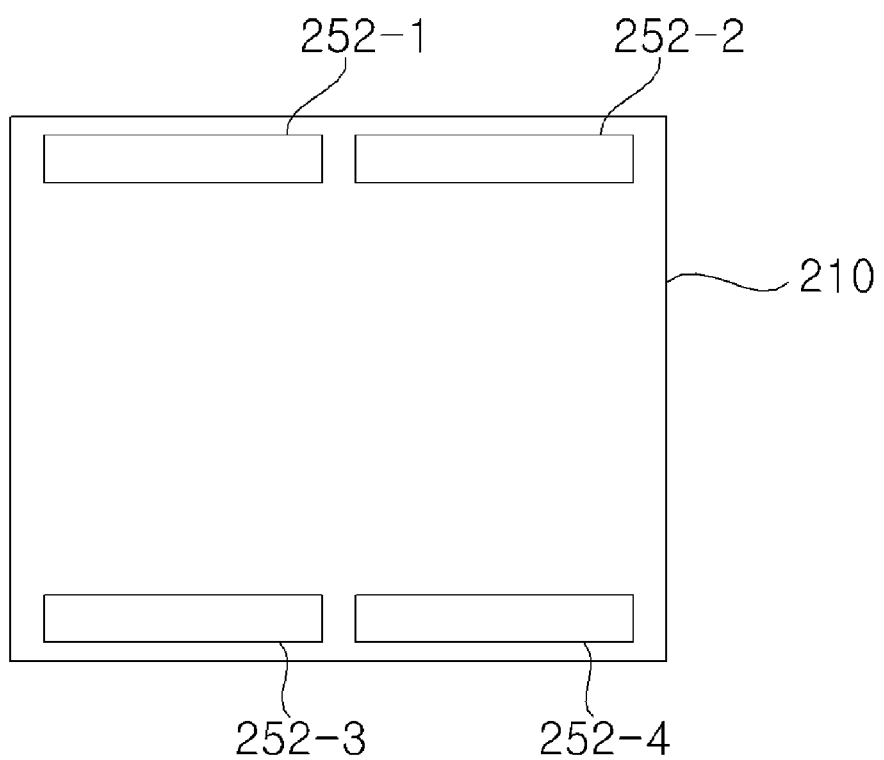
FIGS. 6A to 6C are diagrams illustrating various examples of the arrangement of a backlight of FIG. 5.
Figure 6B:
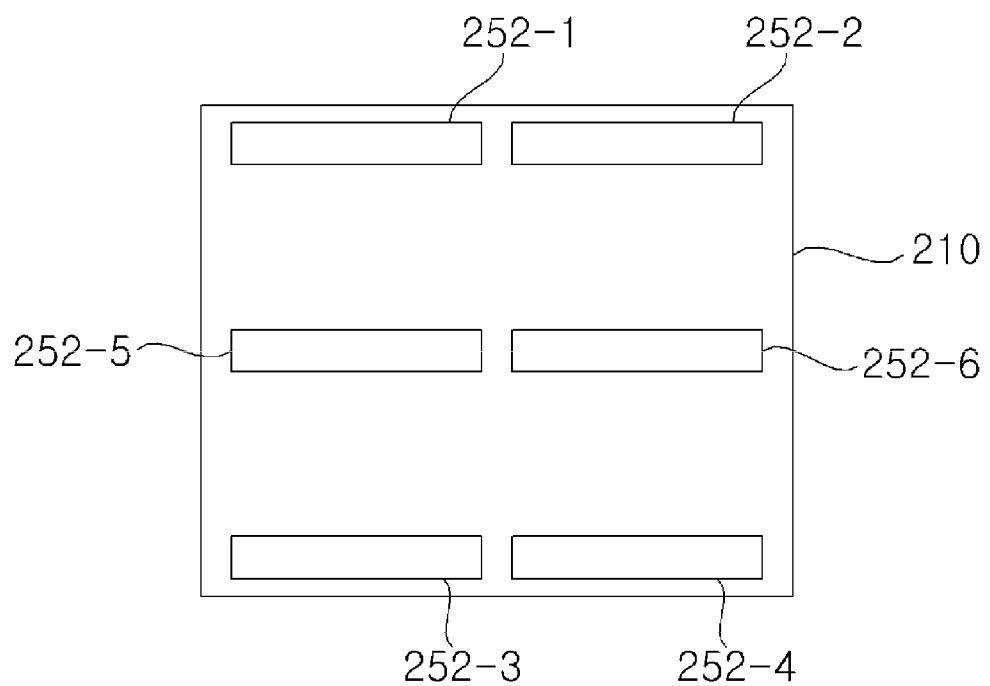
Figure 6C:
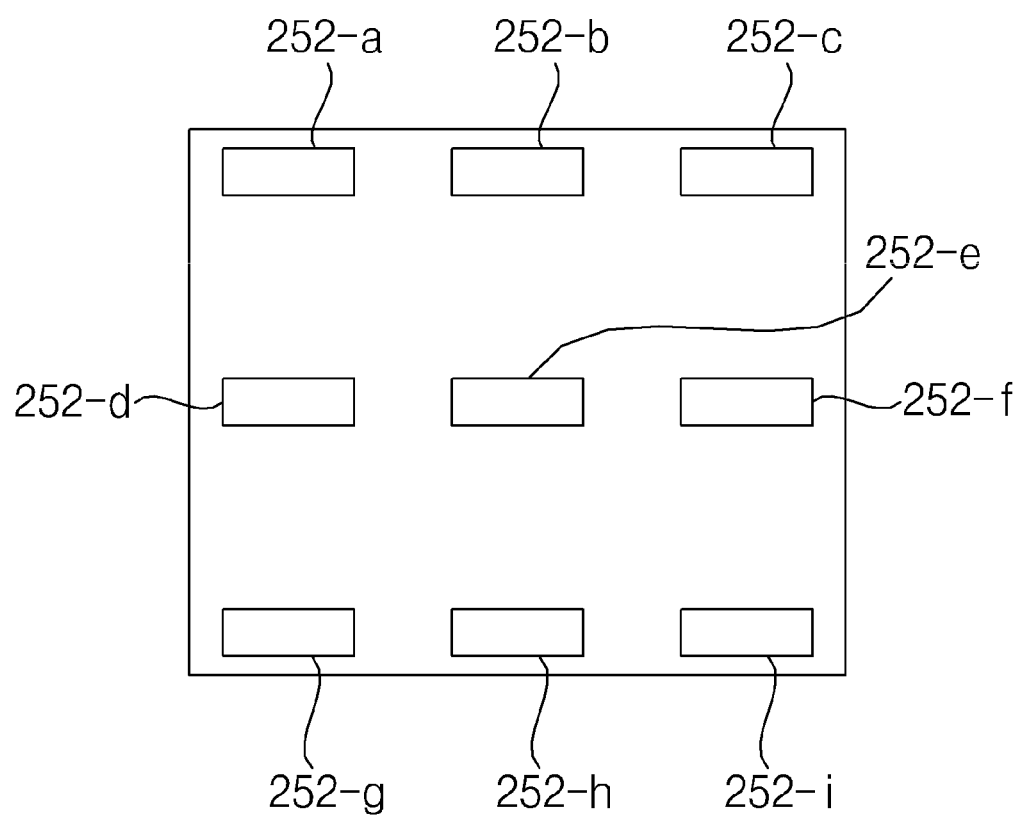

FIGS. 6A to 6C are diagrams illustrating various examples of the arrangement of the backlight of FIG. 5.

First, FIG. 6A illustrates a plurality of light sources 252-1, 252-2, 252-3, and 252-4 disposed at the upper side and the lower side of the rear surface of the liquid crystal panel 210. Each of the plurality of light sources 252-1, 252-2, 252-3, and 252-4 may include a plurality of light emitting diodes (LEDs).

Next, FIG. 6B illustrates a plurality of light sources 252-1, 252-2, 252-3, 252-4, 252-5, and 252-6 disposed at the upper side, the lower side, and the middle of the rear surface of the liquid crystal panel 210. Each of the plurality of light sources 252-1, 252-2, 252-3, 252-4, 252-5, and 252-6 may include a plurality of light emitting diodes (LEDs).

Next, FIG. 6C illustrates a plurality of light sources 252-a, 252-b, and 252-c disposed at the upper side, a plurality of light sources 252-g, 252-h, and 252-i disposed at the lower side, and a plurality of light sources 252-d, 252-e, and 252-f disposed at the middle of the rear surface of the liquid crystal panel 210. Each light source may include a plurality of light emitting diodes (LEDs).

Figure 7:
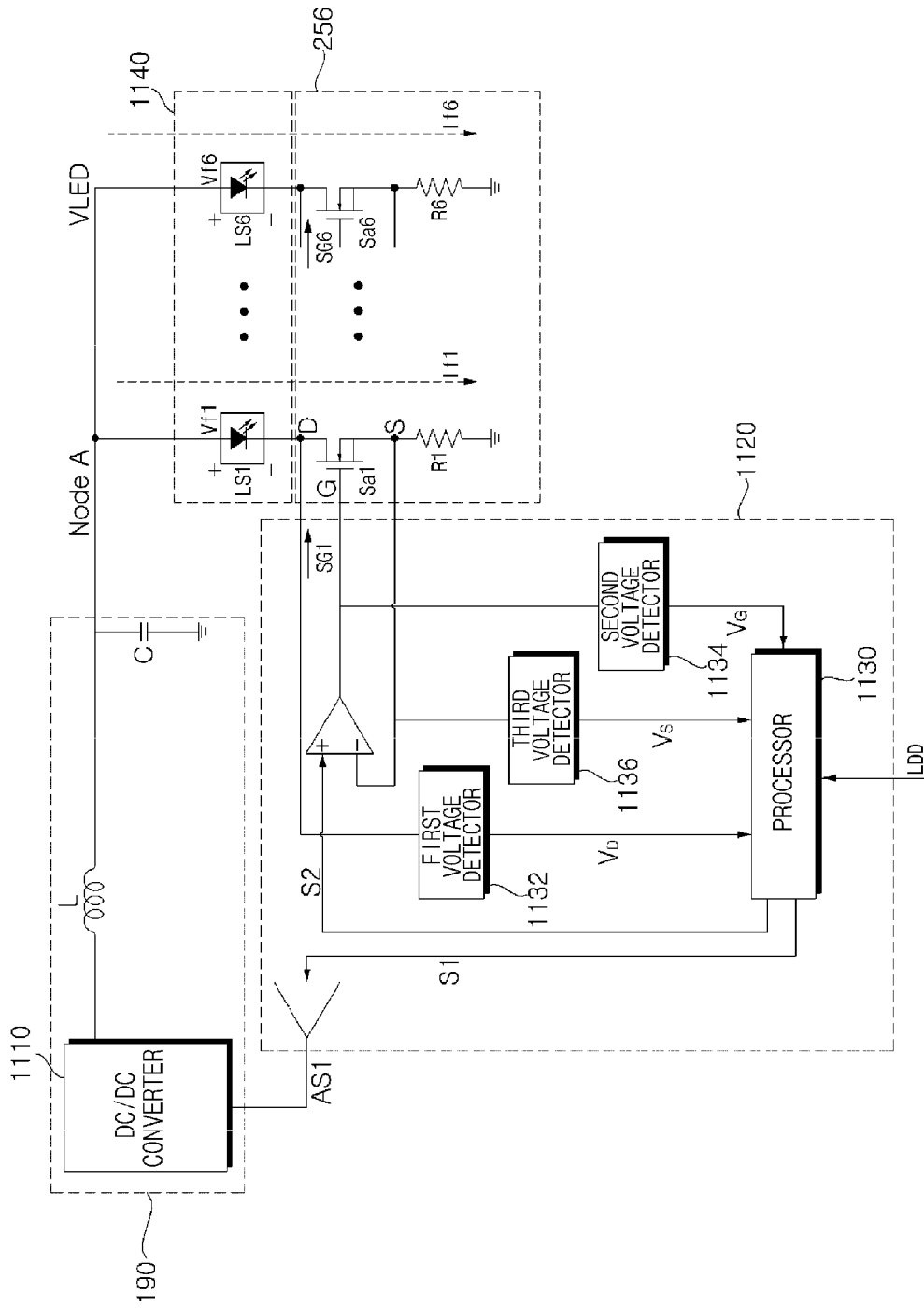
FIG. 7 is an example of a circuit diagram of a backlight device of FIG. 5.

FIG. 7 is an example of a circuit diagram of the backlight device of FIG. 5.

Referring to the figure, the backlight device 250 may include a plurality of light sources LS1 to LS6 (1140) connected to each other in parallel, a light source driver 256 configured to drive the plurality of plurality of light sources LS1 to LS6 (1140), and a processor 1120 configured to control the light source driver 256.

Meanwhile, the backlight device 250 may further include a power supply 190 configured to supply common power VLED to the plurality of light sources LS1 to LS6 (1140).

Here, each of the light sources LS1 to LS6 may include a plurality of LEDs connected to each other in series, in parallel, or in series and parallel.

As described above, as the resolution of the image display apparatus 100 increases to high definition (HD), full HD, ultra-high definition (UHD), 4K, and 8K, the number of LEDs may be increased.

Meanwhile, in the case in which a high-resolution panel 210 is used, control may be performed such that current If having a changed level flows to each of the light source strings 252-1 to 252-5, among the plurality of light sources 252, based on local dimming data in order to improve contrast or definition.

According to this, current If having a changed level flows in proportion to the local dimming data, whereby light having different luminance is output for each of the light source strings 252-1 to 252-5 based on the local dimming data.

Consequently, luminance in a bright portion is brighter and luminance in a dark portion is darker due to current If having an increased level. As a result, contrast or definition may be improved at the time of displaying an image.

The power supply 190 outputs a common voltage VLED to a plurality of light sources. To this end, the power supply 190 may include a DC/DC converter 1110 configured to convert a level of DC voltage and to output DC power having the converted level, an inductor L configured to remove harmonics, etc., and a dc link capacitor C configured to store the DC voltage.

A voltage across the dc link capacitor C corresponds to a voltage supplied between node A and a ground terminal, which may correspond to voltage applied to the plurality of light sources LS1 to LS6 (1140), a plurality of switching devices Sa1 to Sa6, and resistors R1 to R6. That is, a voltage at node A is a common voltage that is supplied to the plurality of light sources LS1 to LS6, and may be referred to as voltage VLED, as illustrated herein.

Voltage VLED is equal to the sum of driving voltage Vf1 of the first light source string LS1, voltage at opposite ends of the first switching device Sa1, and voltage consumed by the first resistor R1.

Alternatively, voltage VLED is equal to the sum of driving voltage Vf1 of the second light source string LS2, voltage at opposite ends of the second switching device Sa2, and voltage consumed by the second resistor R2. Alternatively, voltage VLED is equal to the sum of driving voltage Vf1 of the sixth light source string LS6, voltage at opposite ends of the sixth switching device Sa6, and voltage consumed by the n-th resistor Rn.

Meanwhile, as the resolution of the panel 210 increases, backlight driving voltages Vf1 to Vf6 increase, whereby driving currents If1 to If6 that flow in the backlight increase. Consequently, power consumed by the plurality of switching devices Sa1 to Sa6 and the resistors R1 to R6 increases, whereby stress of the plurality of switching devices Sa1 to Sa6 and the resistors R1 to R6 also increases.

In order to reduce power consumption at the time of driving the backlight, the driving currents If1 to If6 that flow in the plurality of switching devices Sa1 to Sa6 and the resistors R1 to R6 may be decreased. At this time, it is assumed that the backlight driving voltages Vf1 to Vf6 are uniform.

To this end, the driving controller 1120 includes a first voltage detector 1132 configured to detect voltage VD of a drain terminal D of each of the plurality of switching devices Sa1 to Sa6, each of which is implemented with an FET. The driving controller 1120 may further include a second voltage detector 1134 configured to detect voltage VG of each gate terminal G and a third voltage detector 1136 configured to detect voltage VS of each source terminal S.

The driving controller 1120 may compare the drain terminal voltages VD detected at the drain terminals D of the plurality of switching devices Sa1 to Sa6, may generate a target driving current flowing in the plurality of light sources 1140 based on the lowest drain terminal voltage, and may output a switching control signal SG corresponding to the generated target driving current.

The switching control signal SG is input to a comparator, and, when greater than the voltage VD of a detected source terminal, is output from the comparator and is input to the gate terminal G. As a result, the switching device is driven based on the switching control signal SG.

Meanwhile, in order to generate such a switching control signal, the driving controller 1120 may include a processor 1130 configured to generate a switching control signal for driving the gate electrode of each of the plurality of switching devices Sa1 to Sa6 based on the drain terminal voltage of each of the plurality of switching devices Sa1 to Sa6.

Meanwhile, the processor 1130 may control the light source driver 256. Specifically, the processor 1130 may change the turn on duty of each of the plurality of switching devices Sa1 to Sa6 or the level of current flowing in each of the plurality of switching devices Sa1 to Sa6.

In particular, the processor 1130 may adjust the turn on duty of each of the plurality of light sources LS1 to LS6 or the level of current flowing in each of the plurality of light sources LS1 to LS6 is changed.

For example, the processor 1130 may change the level of the switching control signal SG based on the magnitude of the drain terminal voltage VD of each of the plurality of switching devices Sa1 to Sa6.

Meanwhile, the processor 1130 may change the level of the switching control signal SG or the duty of the switching control signal SG based on the magnitude of the drain terminal voltage VD of each of the plurality of switching devices Sa1 to Sa6.

Meanwhile, the processor 1130 may control current If having a changed level to sequentially flow to each of the plurality of light sources 252-1 to 252-6, among the plurality of light sources 252, based on local dimming data.

Meanwhile, the processor 1130 may perform increase the level of current If flowing to each of the light sources 252-1 to 252-6, as the level of local dimming data increases, and decrease the level of current If flowing to each of the light sources 252-1 to 252-6, as the level of local dimming data decreases.

Meanwhile, the processor 1130 may control the level of common voltage output from the power supply to be uniform for each frame.

Figure 8:
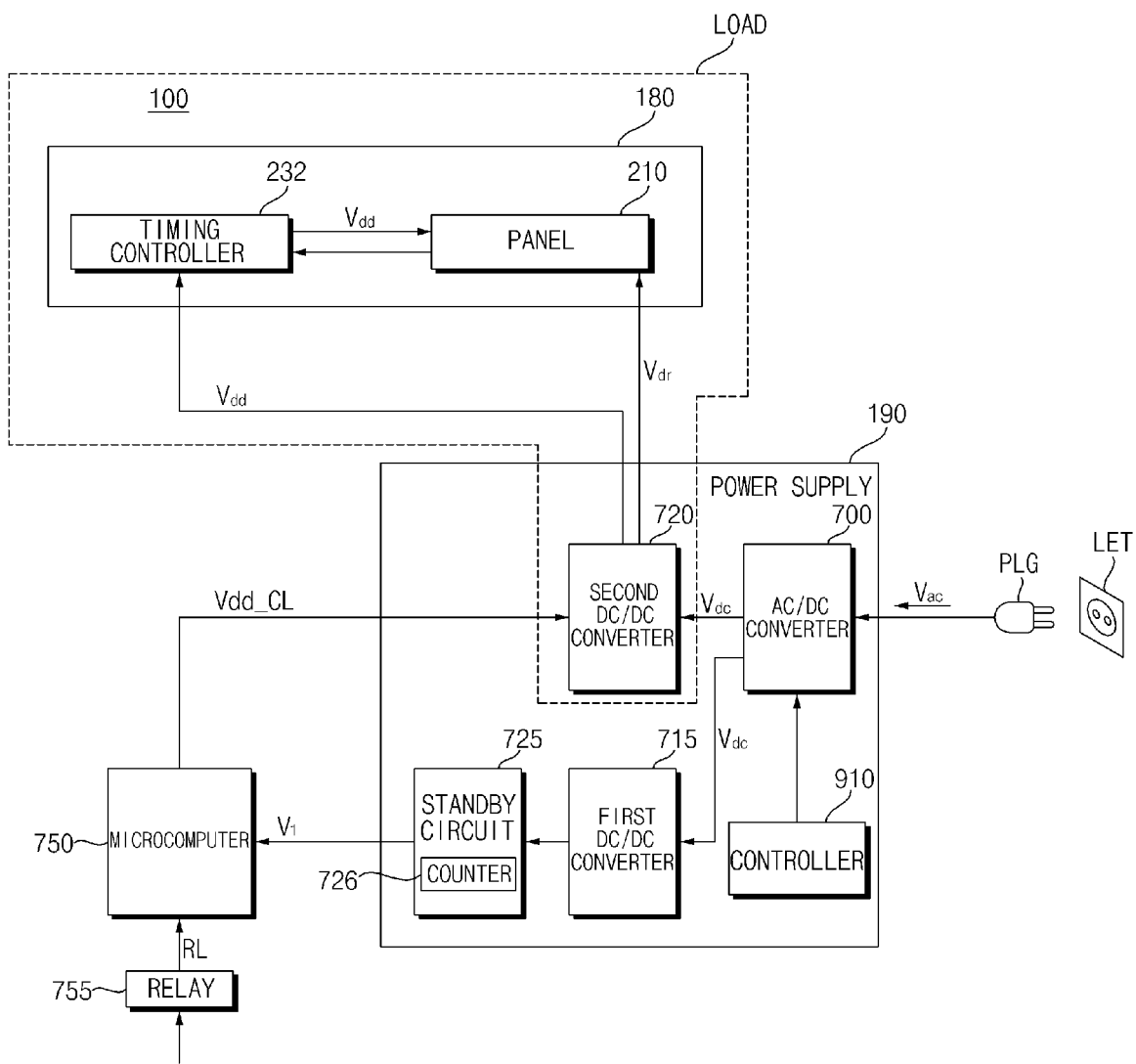
FIG. 8 is an example of an internal circuit diagram of a power supply according to an embodiment of the present disclosure.

FIG. 8 is an example of an internal circuit diagram of a power supply according to an embodiment of the present disclosure.

Referring to FIG. 8, the image display apparatus 100 of FIG. 8 may include a power supply 190, a microcomputer 750, a relay 755, a timing controller 232, and a panel 210.

When a plug PLG is connected to an outlet OUTLET, AC voltage Vac is supplied to the power supply 190. When the plug PLG is disconnected from the outlet OUTLET, no AC voltage is supplied to the power supply 190.

The power supply 190 may include an AC/DC converter 700 configured to convert an AC voltage Vac into a DC voltage, a first DC/DC converter 715 configured to convert a level of DC voltage, a second DC/DC converter 720 configured to convert a level of DC voltage, a standby circuit 725 configured to supply standby power at the time of power off, a controller 910, and the like.

Meanwhile, when a power on signal from the remote controller 200 is received, the relay 755 may be operated, and an operation signal RL may be input to the microcomputer 750.

The microcomputer 750 may be operated by operation power V1 from the power supply 190, and may output a power control signal Vdd_CL to the power supply 190.

The power supply 190 may output operation power Vdd to the timing controller 232 in response to the power control signal Vdd_CL, and may output driving voltage Vdr to the panel 210. The timing controller 232 may output the operation power Vdd to the panel 210.

Meanwhile, the second DC/DC converter 720 and the display 180 may be connected to the output ends of the AC/DC converter 700. Accordingly, the second DC/DC converter 720 and the display 180 may be called a load of the AC/DC converter 700.

Meanwhile, as the resolution of the display 180 increases, the AC/DC converter 700 desirably includes a switching device for efficient supply of high power.

To this end, the controller 910 may control switching of the switching device in the AC/DC converter 700. The operation of the AC/DC converter 700 and the controller 910 will be described with reference to FIG. 9 and subsequent figures.

Figure 9:
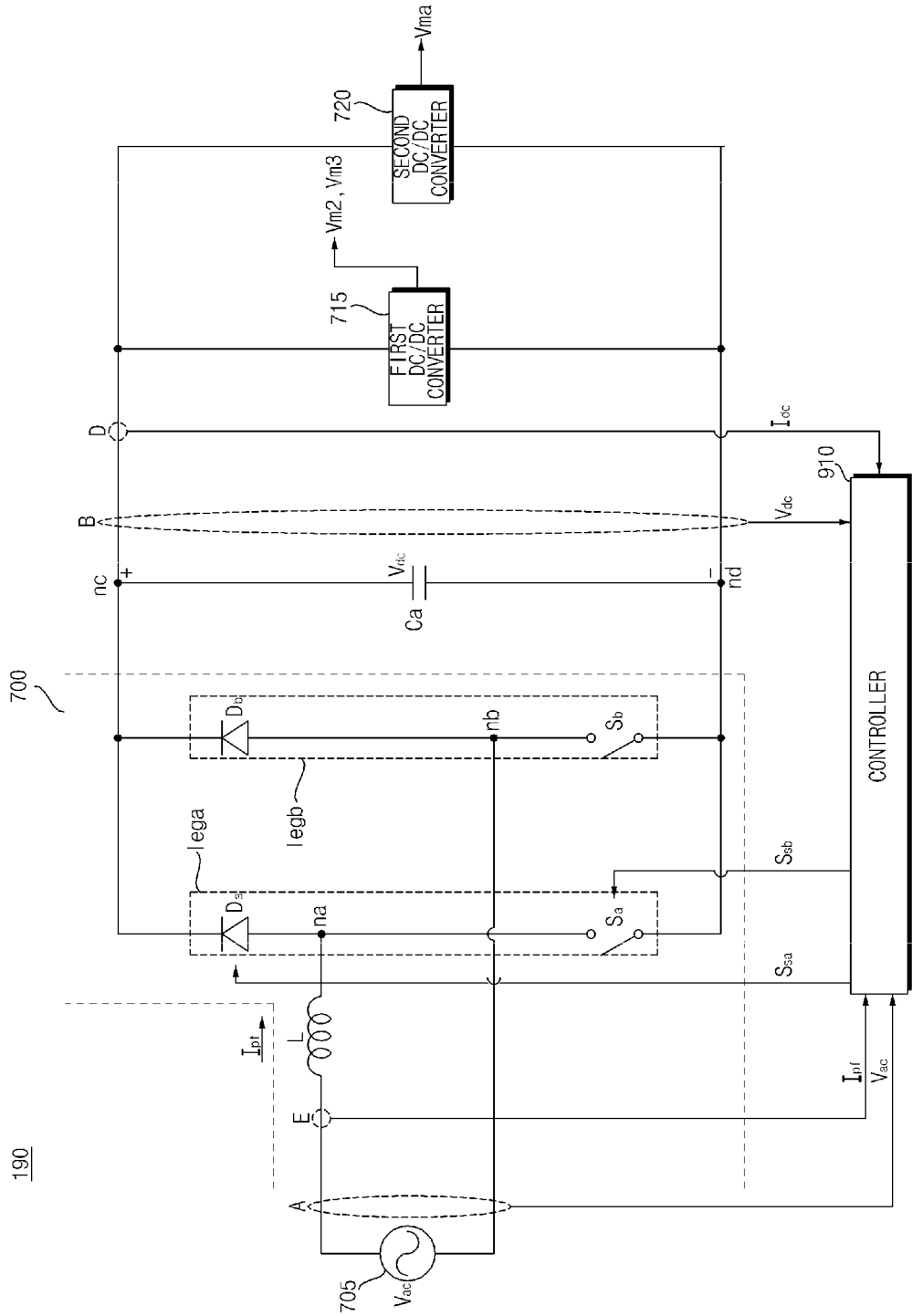
FIG. 9 is an example of an internal circuit diagram of an AC/DC converter according to an embodiment of the present disclosure.

FIG. 9 is an example of an internal circuit diagram of the AC/DC converter of FIG. 8.

Referring to the figure, the power supply 190 according to an embodiment of the present disclosure may include an AC/DC converter 700 configured to convert an input AC voltage Vac 705 into a DC voltage Vdc and to output the DC voltage Vdc, and a controller 910 configured to control the AC/DC converter 700.

The power supply 190 according to an embodiment of the present disclosure may further include an input voltage detector A configured to detect the input AC voltage Vac which is input to the AC/DC converter 700, a dc link capacitor Ca connected to output ends nc-nd of the AC/DC converter 700, and a dc link voltage detector B configured to detect a dc link voltage at both ends nc-nd of the dc link capacitor Ca which are the output ends of the AC/DC converter 700.

Meanwhile, the power supply 190 according to an embodiment of the present disclosure may further include an input current detector E configured to detect an input current flowing in the AC/DC converter 700, and a dc link current detector D configured to detect a dc link current flowing through a dc link at both ends nc-nd of the dc link capacitor Ca which are the output ends of the AC/DC converter 700.

The input voltage detector A may detect an input AC voltage Vac input to the AC/DC converter 700. To this end, the input voltage detector A may include a resistor, an amplifier, and the like. The detected input AC voltage Vac may be input to the controller 910 as a pulse type discrete signal.

The input current detector E may detect a current Ipf flowing in the AC/DC converter 700. To this end, a current transformer (CT), a shunt resistor, and the like may be used as the input current detector E. The detected current Ipf may be input to the controller 910 as a pulse type discrete signal.

The dc link voltage detector B may detect a dc link voltage Vdc at both ends nc-nd of the dc link capacitor Ca which are the output ends of the AC/DC converter 700. To this end, the dc link voltage detector B may include a resistor, an amplifier, and the like. The detected dc link voltage Vdc may be input to the controller 910 as a pulse type discrete signal.

Meanwhile, both ends nc-nd of the dc link capacitor Ca, which are the output ends of the AC/DC converter 700, may be referred to as a dc link.

The dc link current detector D may detect a dc link current Idc flowing through the output ends of the AC/DC converter 700. To this end, a current transformer (CT), a shunt resistor, and the like may be used as the dc link current detector D. The detected dc link current Idc may be input to the controller 910 as a pulse type discrete signal.

Meanwhile, in order to efficiently supply high power, the AC/DC converter 700 may include a plurality of switching devices Sa and Sb and a plurality of diodes Da and Db, and may convert the level of input AC voltage Vac based on a switching operation of the switching devices Sa and Sb, and may output a DC voltage Vdc.

Specifically, the AC/DC converter 700 may include a first leg lega including a first diode Da and a first switching device Sa that are connected in series to each other, and a second leg legb including a second diode Db and a second switching device Sb that are connected in series to each other and connected in parallel to the first leg lega.

One end (cathode) of the first diode Da may be connected to one end nc of the output ends nc-nd of the AC/DC converter 700, and the other end (anode) of the first diode Da may be connected to a first node na.

One end of the first switching device Sa may be connected to the first node na, and the other end of the first switching device Sa may be connected to the other end nd of the output ends nc-nd of the AC/DC converter 700.

One end (cathode) of the second diode Db may be connected to one end nc of the output ends nc-nd of the AC/DC converter 700, and the other end (anode) of the second diode Db may be connected to a second node nb.

One end of the second switching device Sb may be connected to the second node nb, and the other end of the second switching device Sb may be connected to the other end nd of the output ends nc-nd of the AC/DC converter 700.

Meanwhile, the AC/DC converter 700 of FIG. 9 may be referred to as a half-bridge type AC/DC converter 700.

Meanwhile, the AC/DC converter 700 may further include an inductor L disposed between the first node na, which is located between the first diode Da and the first switching device Sa, and an input end to which the input AC voltage Vac is input.

Meanwhile, the input current detector E may detect a current flowing in the inductor L of the AC/DC converter 700.

Meanwhile, the first DC/DC converter 715 and the second DC/DC converter 720, which are connected to both ends of the dc link capacitor Ca, may be connected to the output ends nc-nd of the AC/DC converter 700. The first DC/DC converter 715 and the second DC/DC converter 720 may be connected in parallel to each other.

That is, the power supply 190 may further include the first DC/DC converter 715 configured to convert the level of dc link voltage Vdc to supply voltages Vm2 and Vm3 to the controller 910 and the like, and the second DC/DC converter 720 configured to convert the level of dc link voltage Vdc to supply a driving voltage Vdr to the display 180. Accordingly, the power supply 190 may output various voltages.

In this case, the level of driving voltage Vdr may be greater than the level of voltages Vm2 and Vm3 supplied to the controller 910 and the like.

For example, the level of voltages Vm2 and Vm3 may be 20 V to 30 V, and the level of driving voltage may be 40 V to 100 V.

Figure 10:
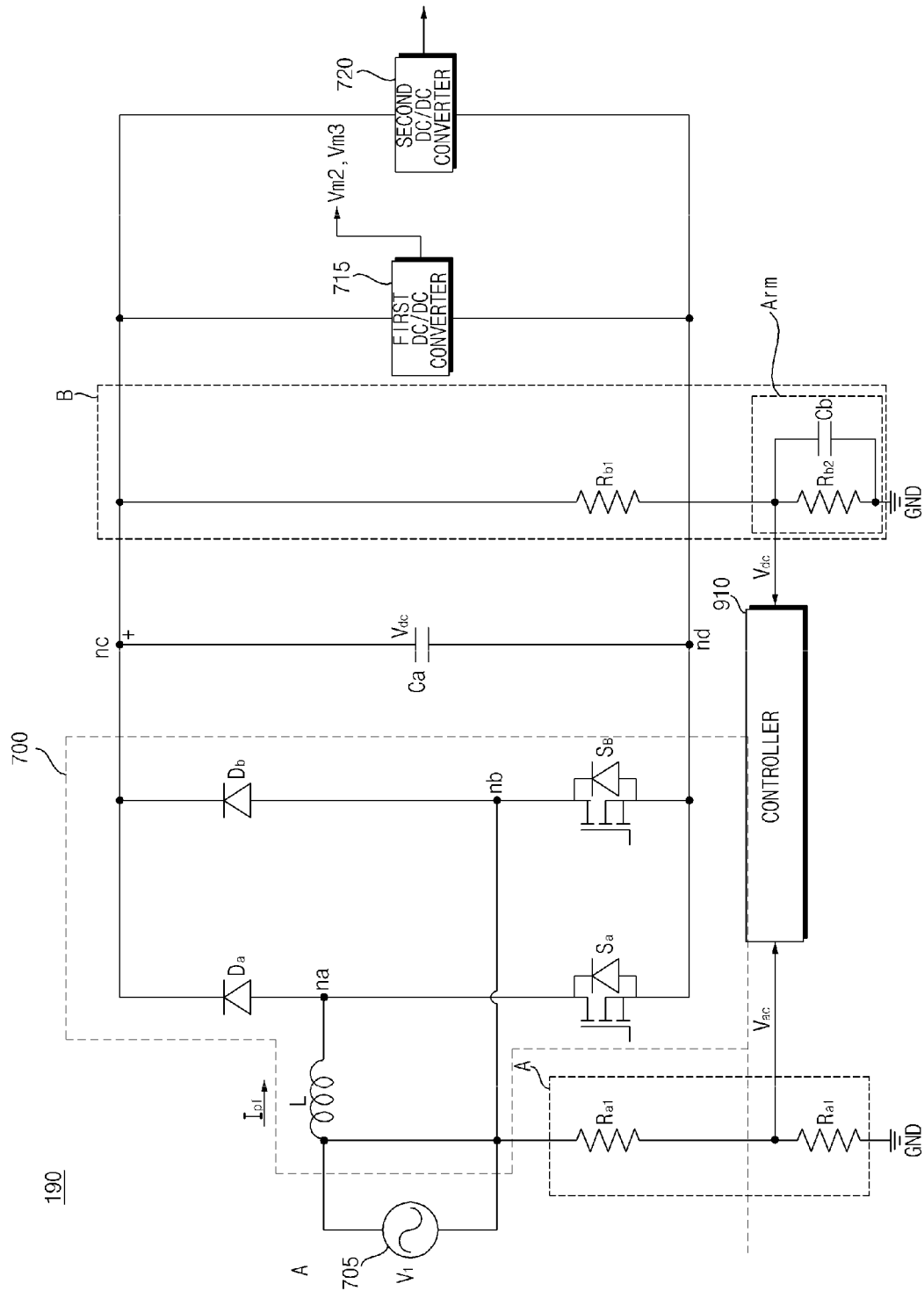
FIG. 10 is an internal circuit diagram of an input voltage detector and a dc link voltage detector of FIG. 9.

FIG. 10 is a diagram illustrating an example of an internal circuit diagram of an input voltage detector and a dc link voltage detector.

Referring to the drawing, the AC/DC converter 700 in the power supply 190 according to an embodiment of the present disclosure may include an input voltage detector A configured to detect an input AC voltage Vac, and a dc link voltage detector B configured to detect a dc link voltage Vdc.

Meanwhile, the input voltage detector A may include a first resistor Ra1 having one end connected between the input AC voltage Vac and the AC/DC converter 700, and a second resistor Ra2 having one end connected to another end of the first resistor Ra1 and another end connected to the ground terminal GND, in which a voltage at both ends of the second resistor Ra2 may be input to the controller 910. Accordingly, the controller 910 may operate based on the detected input AC voltage Vac.

Meanwhile, the dc link voltage detector B may include a third resistor Rb1 having one end connected to one end of the dc link, a fourth resistor Rb2 having one end connected to another end of the third resistor Rb1 and another end connected to the ground terminal GND, and a capacitor Cb connected in parallel to both ends of the fourth resistor Rb2, in which a voltage at both ends of the fourth resistor Rb2 may be input to the controller 910. Accordingly, the controller 910 may operate based on the detected dc link voltage Vdc.

Meanwhile, the capacitor Cb connected in parallel to both ends of the fourth resistor Rb2 is disposed to reduce noise or peak component of the voltage at both ends of the fourth resistor RB2.

Figure 11A:
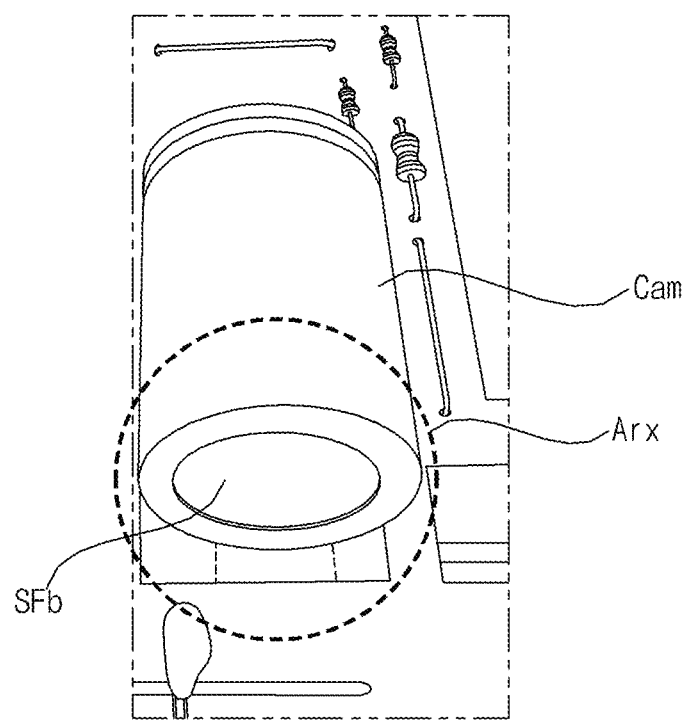
FIGS. 11A and 11B are diagrams illustrating various examples of the dc link capacitor of FIG. 9.
Figure 11B:
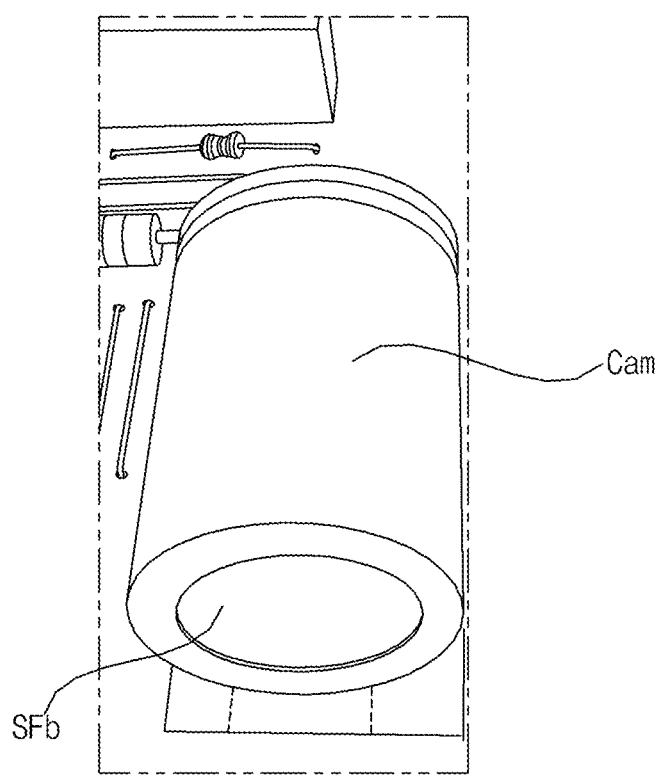

FIGS. 11A and 11B are diagrams illustrating various examples of the dc link capacitor of FIG. 9.

First, FIG. 11A is a diagram illustrating an example in which explosion prevention Arx occurs at a bottom surface SFb of the dc link capacitor Ca in the AC/DC converter 700 according to an embodiment of the present disclosure.

For example, when the AC/DC converter 700, which is required to output a DC voltage of about 310 V, outputs a voltage of about 700 V or higher due to a malfunction, explosion prevention Arx occurs at the bottom surface SFb of the dc link capacitor Ca as illustrated in FIG. 11A. That is, the dc link capacitor Ca is burned out.

Next, FIG. 11B is a diagram illustrating a normal bottom surface SFb of the dc link capacitor Ca in the AC/DC converter 700 according to an embodiment of the present disclosure. That is, the dc link capacitor Ca is not burned out.

Figure 12:
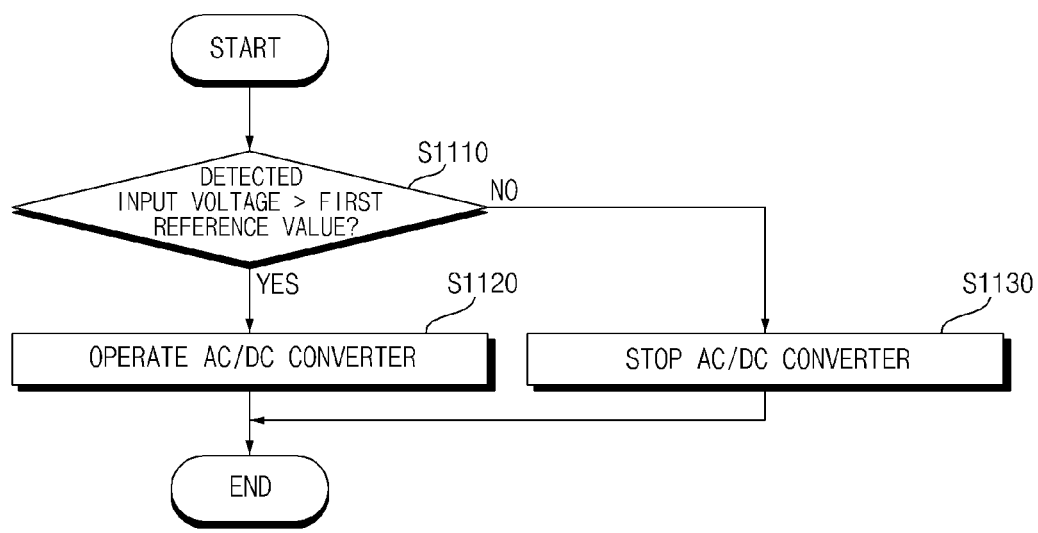
FIG. 12 is a flowchart illustrating an operating method of an AC/DC converter related to the present disclosure.

FIG. 12 is a flowchart illustrating an operating method of an AC/DC converter related to the present disclosure.

Referring to the drawing, the controller 910 in the power supply 190 determines whether an input AC voltage Vac, detected by the input voltage detector A, exceeds a first reference value Vref1 (S1110), and when the input AC voltage exceeds the first reference value, the controller 910 determines that the input AC voltage is normal with no anomalies and may control the AC/DC converter 700 to operate (S1120).

For example, when the input AC voltage Vac, detected by the input voltage detector A, exceeds the first reference value Vref1, the controller 910 in the power supply 190 supplies a PWM control signal to the first switching device Sa and the second switching device Sb in the AC/DC converter 700, to control the first switching device Sa and the second switching device Sb to perform a switching operation.

Meanwhile, when the input AC voltage Vac, detected by the input voltage detector A, is lower than or equal to the first reference value Vref1, the controller 910 in the power supply 190 determines that the input AC voltage is abnormal, and may control the AC/DC converter 700 to stop operating (S1130).

For example, when the input AC voltage Vac, detected by the input voltage detector A, is lower than or equal to the first reference value Vref1, the controller 910 in the power supply 190 does not output a PWM control signal to the first switching device Sa and the second switching device Sb in the AC/DC converter 700, and thus may control the first switching device Sa and the second switching device Sb to be turned off.

Figure 13:
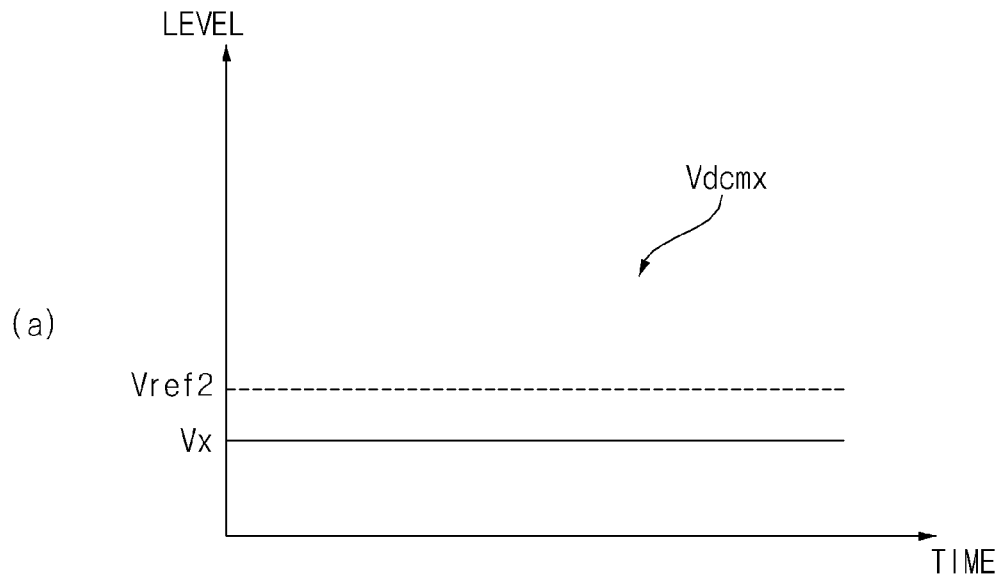
FIG. 13 is a diagram referred to in the description of operation of FIG. 12.
Figure 13:
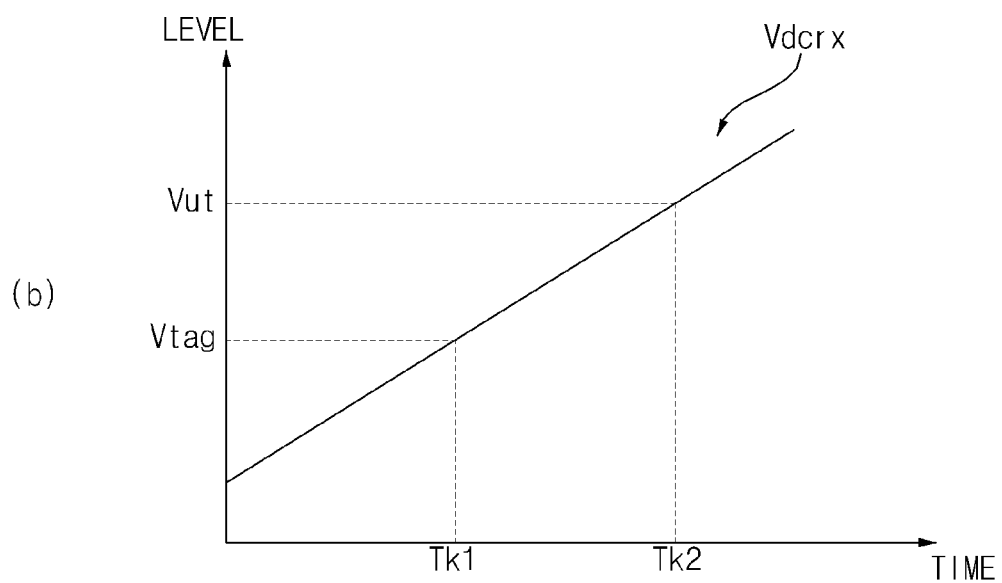

FIG. 13 is a diagram referred to in the description of operation of FIG. 12.

In FIG. 13, (a) illustrates an example in which a voltage Vdcmx, detected by the dc link voltage detector B, is Vx which is lower than or equal to a second reference value Vref2.

For example, when a capacitor Cb, which is connected in parallel to both ends of the fourth resistor Rb2 of FIG. 10, is short-circuited due to a peak component or noise, a resistive component of the fourth resistor Rb2 is close to zero, such that a voltage across the fourth resistor Rb2 significantly drops.

Meanwhile, as the voltage across the fourth resistor Rb2 which is input to the controller 910 significantly drops, the controller 910 determines that the dc link voltage is much lower than a target voltage Vtag, and increases a duty of a PWM signal to increase turn-on time of the first switching device Sa and the second switching device Sb.

Accordingly, as illustrated in (b) of FIG. 13, an actual dc link voltage Vdcrx continuously increases to a value higher than the target voltage Vtag at a time point Tk1, and then, at a time point Tk2 reaches a voltage Vut which is an acceptable upper limit.

In this case, the target voltage Vtag may be about 310 V, and the voltage Vut which is the acceptable upper limit may be about 700 V.

As described above, as the dc link voltage Vdc continuously increases, explosion prevention occurs in the dc link capacitor Ca as illustrated in FIG. 11A.

Accordingly, embodiments of the present disclosure provide a method of preventing the possibility of burnout of the dc link capacitor Ca as illustrated in FIG. 11A, which will be described below with reference to FIG. 14 and subsequent figures.

Figure 14:
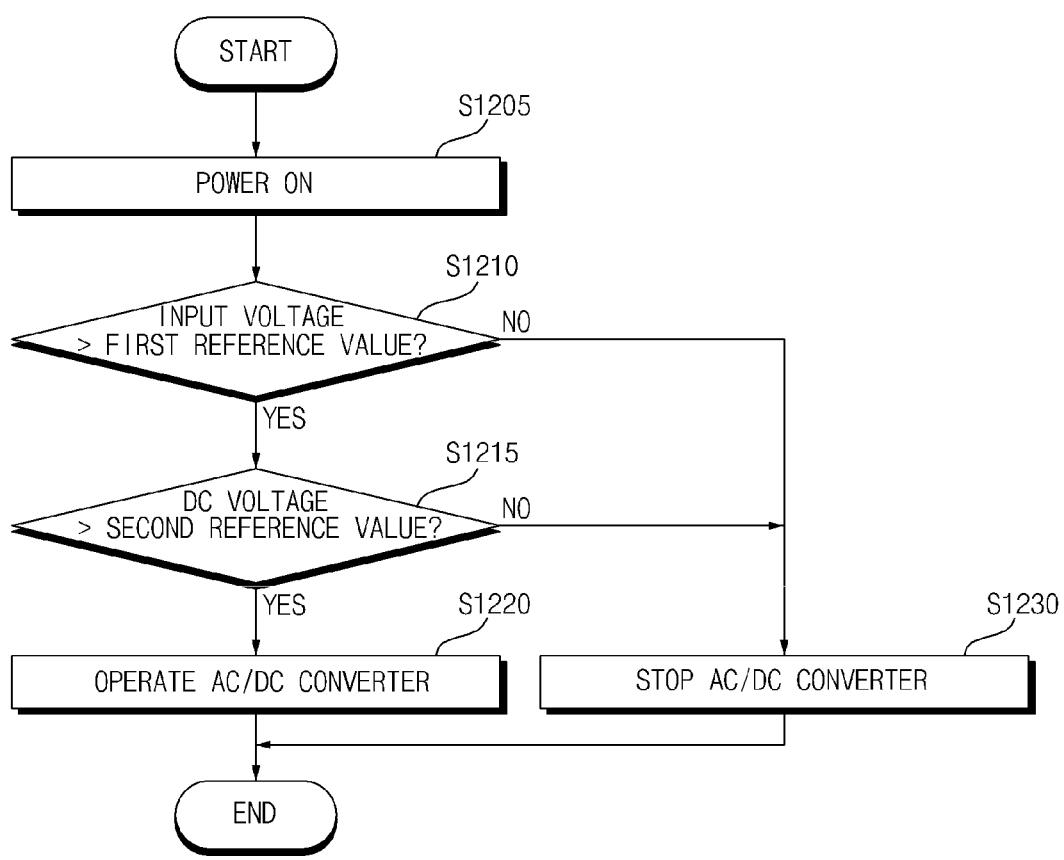
FIG. 14 is a flowchart illustrating an operating method of an image display apparatus according to an embodiment of the present disclosure.

FIG. 14 is a flowchart illustrating an operating method of an image display apparatus according to an embodiment of the present disclosure.

Referring to the drawing, the controller 910 in the power supply 190 is powered on in in response to a power-on input (S1205).

Then, the controller 910 in the power supply 190 determines whether the input AC voltage Vac, detected by the input voltage detector A, exceeds the first reference value Vref1 (S1201), and when the input AC voltage Vac exceeds the first reference value Vref1, the controller 910 determines whether the detected dc link voltage Vdc exceeds a second reference value Vref2 which is lower than the first reference value Vref1 (S1215).

Further, when the detected dc link voltage Vdc exceeds the second reference value Vref2, the controller 910 in the power supply 190 may determine that the input Ac voltage Vac and the dc link voltage Vdc are normal with no anomalies, and may control the AC/DC converter 700 to operate (S1220).

For example, when the input AC voltage Vac, detected by the input voltage detector A, exceeds the first reference value Vref1 and the detected dc link voltage Vdc exceeds the second reference value Vref2 which is lower than the first reference value Vref1, the controller 910 in the power supply 190 supplies a PWM control signal to the first switching device Sa and the second switching device Sb in the AC/DC converter 700, to control the first switching device Sa and the second switching device Sb to perform a switching operation.

As described above, the controller 910, after being powered on, determines whether there is no abnormality in the input AC voltage Vac and the dc link voltage Vdc, and then, when there is no abnormality, the controller 910 switches the first switching device Sa and the second switching device Sb, instead of determining whether there is no abnormality in the input AC voltage Vac and the dc link voltage Vdc after the controller 910 is powered on and switches the first switching device Sa and the second switching device Sb. Accordingly, it is possible to prevent burnout of the dc link capacitor Ca and the like.

Meanwhile, the first reference value Vref1 may be about 65 V to 80 V, and the second reference value Vref2 may be about 50 V to 60 V.

Meanwhile, when the input AC voltage Vac detected by the input voltage detector A is lower than or equal to the first reference value Vref1 in operation 1210 (S1210), the controller 910 in the power supply 190 may determine that the voltage is abnormal and control the AC/DC converter 700 to stop operating.

For example, when the input AC voltage Vac detected by the input voltage detector A is lower than or equal to the first reference value Vref1, the controller 910 in the power supply 190 does not output a PWM control signal to the first switching device Sa and the second switching device Sb in the AC/DC converter 700, and thus may control the first switching device Sa and the second switching device Sb to be turned off.

Meanwhile, when the dc link voltage Vdc detected by the dc link voltage detector B is lower than or equal to the second reference Vref2 in operation 1215 (S1215), the controller 910 in the power supply 190 may determine that the voltage is abnormal and control the AC/DC converter 700 to stop operating.

For example, when the dc link voltage Vdc, detected by the dc link voltage detector B, is lower than or equal to the second reference Vref2, the controller 910 in the power supply 190 does not output the PWM control signal to the first switching device Sa and the second switching device Sb in the AC/DC converter 700, and thus may control the first switching device Sa and the second switching device Sb to be turned off.

Accordingly, burnout of the dc link capacitor Ca may be prevented. Particularly, it is possible to prevent burnout of the dc link capacitor Ca resulting from a continuous increase in dc link voltage Vdc due to an error in detection of the dc link voltage Vdc.

That is, after being powered on and before operation of the switching devices in the AC/DC converter 700, the controller 910 determines whether the detected dc link voltage Vdc is lower than or equal to the second reference value Vref2, and when the detected dc link voltage Vdc is lower than or equal to the second reference value Vref2, the controller 910 may control the AC/DC converter 700 to stop operating. Accordingly, burnout of the dc link capacitor Ca may be prevented.

Meanwhile, after being powered on and before operation of the switching devices in the AC/DC converter 700, the controller 910 determines whether the detected input AC voltage Vac is lower than or equal to the first reference value Vref1, and when the detected input AC voltage Vac is lower than or equal to the first reference value Vref1, the controller 910 may control the AC/DC converter 700 to stop operating. Accordingly, burnout of the dc link capacitor Ca may be prevented.

Meanwhile, after being powered on and before operation of the first switching device Sa and the second switching device Sb, the controller 910 determines whether the detected dc link voltage Vdc is lower than or equal to the second reference value Vref2, and when the dc link voltage Vdc is lower than or equal to the second reference value Vref2, the controller 910 may control the AC/DC converter 700 to stop operating.

Accordingly, burnout of the dc link capacitor Ca may be prevented.

FIGS. 15A to 16C are diagrams referred to in the description of operation of FIG. 14.

Figure 15A:
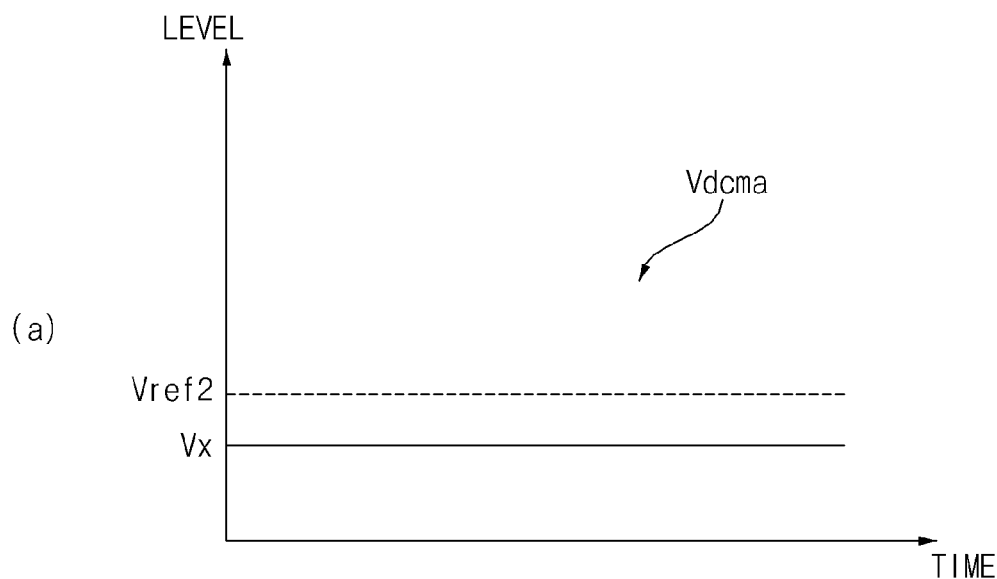
FIGS. 15A to 16C are diagrams referred to in the description of operation of FIG. 14.
Figure 15A:
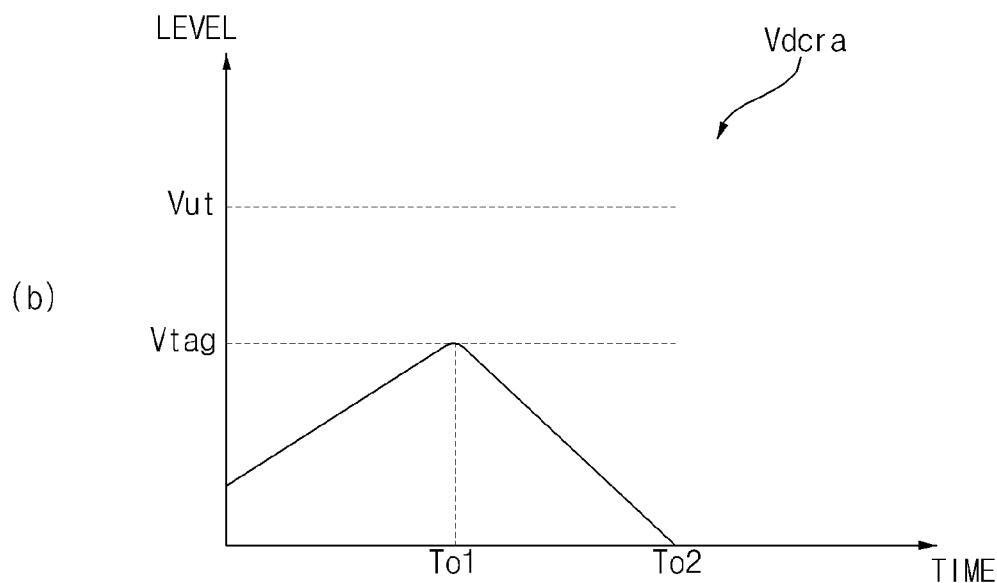

In FIG. 15A, (a) illustrates an example in which a voltage Vdcma, detected by the dc link voltage detector B, is lower than or equal to the second reference value Vref2.

For example, when a capacitor Cb, which is connected in parallel to both ends of the fourth resistor Rb2 of FIG. 10, is short-circuited due to a peak component or noise, a resistive component of the fourth resistor Rb2 is close to zero, such that a voltage across the fourth resistor Rb2 significantly drops.

Meanwhile, after being powered on and before a switching operation of the first switching device Sa and the second switching device Sb, the controller 910 in the power supply 190 according to an embodiment of the present disclosure may detect that a voltage across the fourth resistor RB2, which is input form the dc link voltage detector B, significantly drops.

That is, after being powered on and before a switching operation of the first switching device Sa and the second switching device Sb, the controller 910 in the power supply 190 according to an embodiment of the present disclosure determines whether the dc link voltage Vdc, which is detected by the dc link voltage detector B, is lower than or equal to the second reference value Vref2.

Further, when the dc link voltage Vdc, which is detected by the dc link voltage detector B, is lower than or equal to the second reference value Vref2, the controller 910 in the power supply 190 according to an embodiment of the present disclosure may control the first switching device Sa and the second switching device Sb to stop operating, without being switched, after the controller 910 is powered on.

Accordingly, as illustrated in (b) of FIG. 15A, an actual dc link voltage Vdcra partially rises, and then drops as the first switching device Sa and the second switching device Sb are turned off.

In the drawing, an example is illustrated in which the actual dc link voltage Vdcra rises to a target voltage Vtag at a time point To1, and then drops to the ground voltage at a time point To2.

Meanwhile, unlike (b) of FIG. 15A, the actual dc link voltage Vdcra may also drop to the ground voltage without reaching the target voltage.

That is, when a voltage detected by the dc link voltage detector B is lower than or equal to the second reference value Vref2, when the dc link voltage Vdc continuously increases, the controller 910 may be configured to drop the dc link voltage Vdc by turning off the AC/DC converter 700.

Accordingly, burnout of the dc link capacitor Ca may be prevented. Particularly, it is possible to prevent burnout of the dc link capacitor Ca resulting from a continuous increase in dc link voltage Vdc due to an error in detection of the dc link voltage Vdc. Accordingly, a state of the dc link capacitor Ca may correspond to FIG. 11B, rather than FIG. 11A.

Figure 15B:
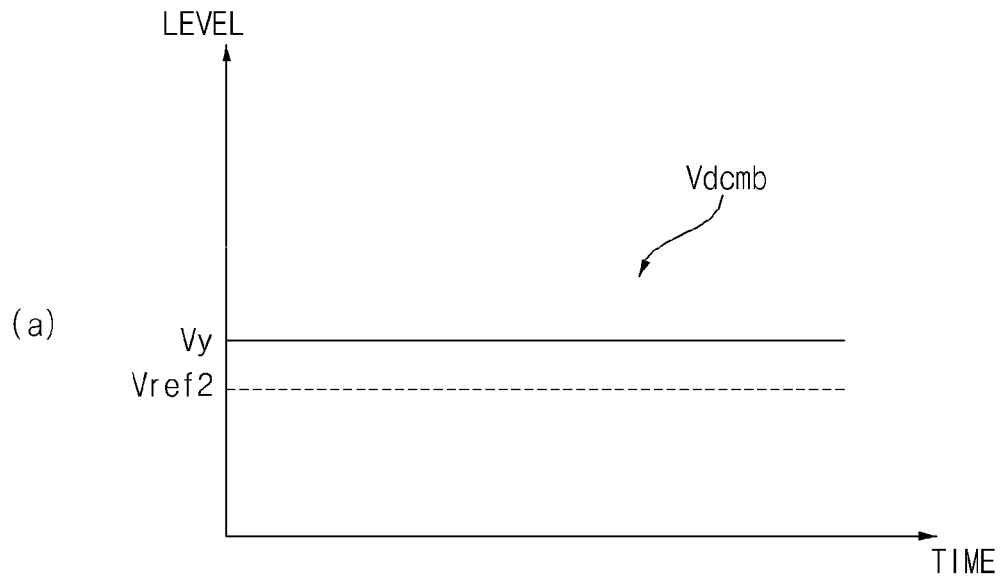
Figure 15B:
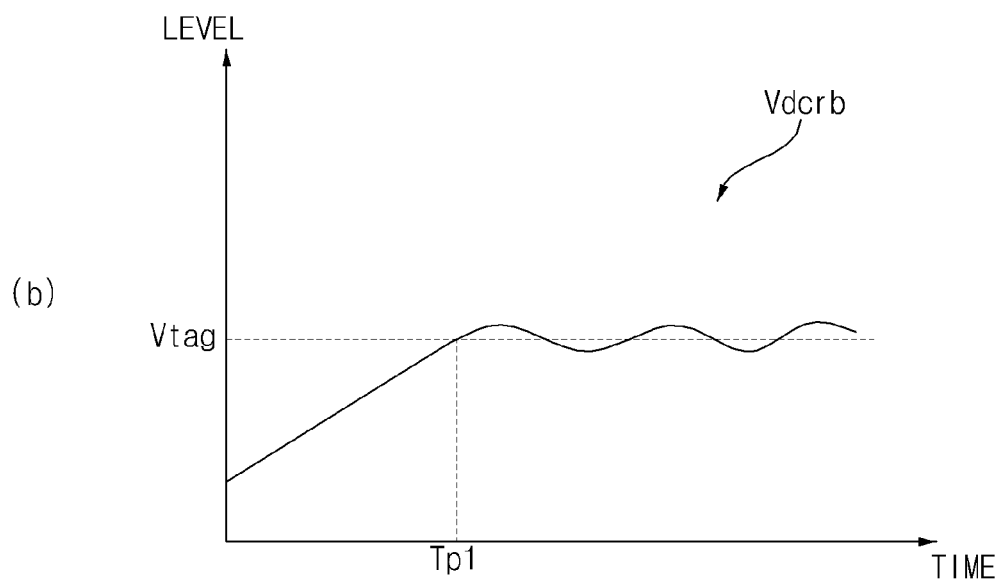

In FIG. 15B, (a) illustrates an example in which a voltage Vdcmb detected by the dc link voltage detector B is V2 which exceeds the second reference value Vref2.

That is, an example is illustrated in which the voltage Vdcmb detected by the dc link voltage detector B is within a normal range.

Accordingly, when the voltage Vdcmb detected by the dc link voltage detector B exceeds the second reference value Vref2, the controller 910 may control the dc link voltage Vdc to rise to a target voltage Vtag, and after the dc link voltage Vdc rises to the target voltage Vtag, the controller 910 may control the dc link voltage Vdc to maintain the target voltage Vtag.

In FIG. 15B, (b) illustrates an example in which an actual dc link voltage Vdcrb continuously increases to the target voltage Vtag at a time point Tpl, and then, after the time point Tpl, is slightly changed but is mostly maintained at the target voltage Vtag. Accordingly, the dc link voltage Vdc may be stably maintained at the target voltage Vtag.

Figure 16A:
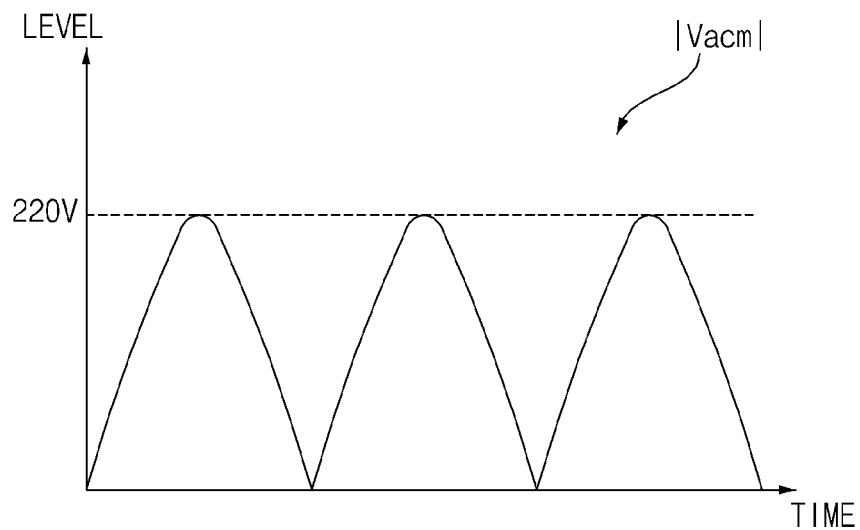

FIG. 16A is a diagram illustrating a rectified waveform Vacm of the input AC voltage Vac.

Referring to the drawing, the input AC voltage Vac with a positive polarity and a negative polarity in the AC/DC converter 700 is rectified, such that a positive polarity voltage waveform is produced as illustrated in the drawing.

Figure 16B:
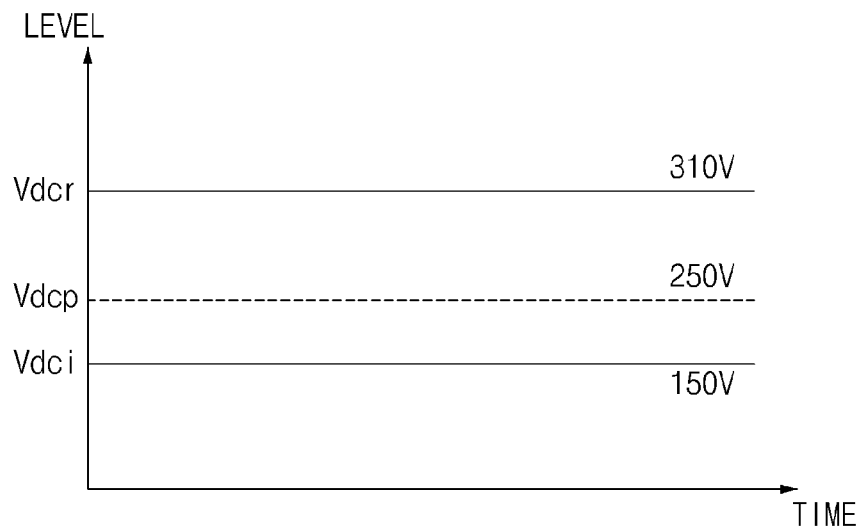

FIG. 16B is a diagram illustrating various levels of dc link voltage Vdc.

Referring to the drawing, the target voltage Vtag of the dc link voltage Vdc is Vdr which is about 310V, and a second reference value Vred2 is Vdci which is about 150 V.

Meanwhile, when the dc link voltage Vdc is Vdcp which is between Vdr and Vdci, switching may be performed stably in AC/DC converter 700.

However, a level of the second reference value Vred2 may be changed depending on design and may be about 50 V to 60 V as described above.

Figure 16C:
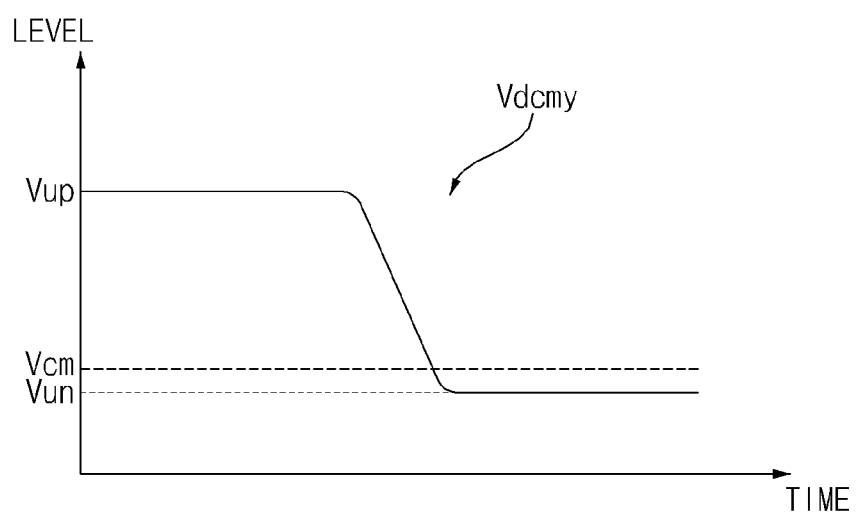

FIG. 16C is a diagram illustrating various levels of a voltage Vdcmy detected by the dc link voltage detector B.

Referring to the drawing, the voltage Vdcmy detected by the dc link voltage detector B is maintained at a voltage level Vup which is within a normal range, and then the voltage level may be reduced as the capacitor Cb connected in parallel to both ends of the fourth resistor Rb2 is short-circuited.

Meanwhile, the second reference value Vref may correspond to Vun.

For example, when the voltage Vdcmy detected by the dc link voltage detector B is detected at a voltage level Vcm higher than Vun, the AC/DC converter 700 may normally perform switching.

In another example, when the voltage Vdcmy detected by the dc link voltage detector B is detected at a voltage level lower than or equal to the voltage level Vcm, it is desirable that the AC/DC converter 700 does not operate and is switched off. Accordingly, burnout of the dc link capacitor Ca may be prevented. Particularly, it is possible to prevent burnout of the dc link capacitor Ca resulting from a continuous increase in dc link voltage Vdc due to an error in detection of the dc link voltage Vdc.

Meanwhile, the operation of the power supply 190 in FIGS. 8 to 16C may be applied per se to an organic light emitting diode panel 210b or an inorganic light emitting diode panel, in addition to the liquid crystal panel 210.

Hereinafter, a display 180 including an organic light emitting diode panel will be described.

Figure 17:
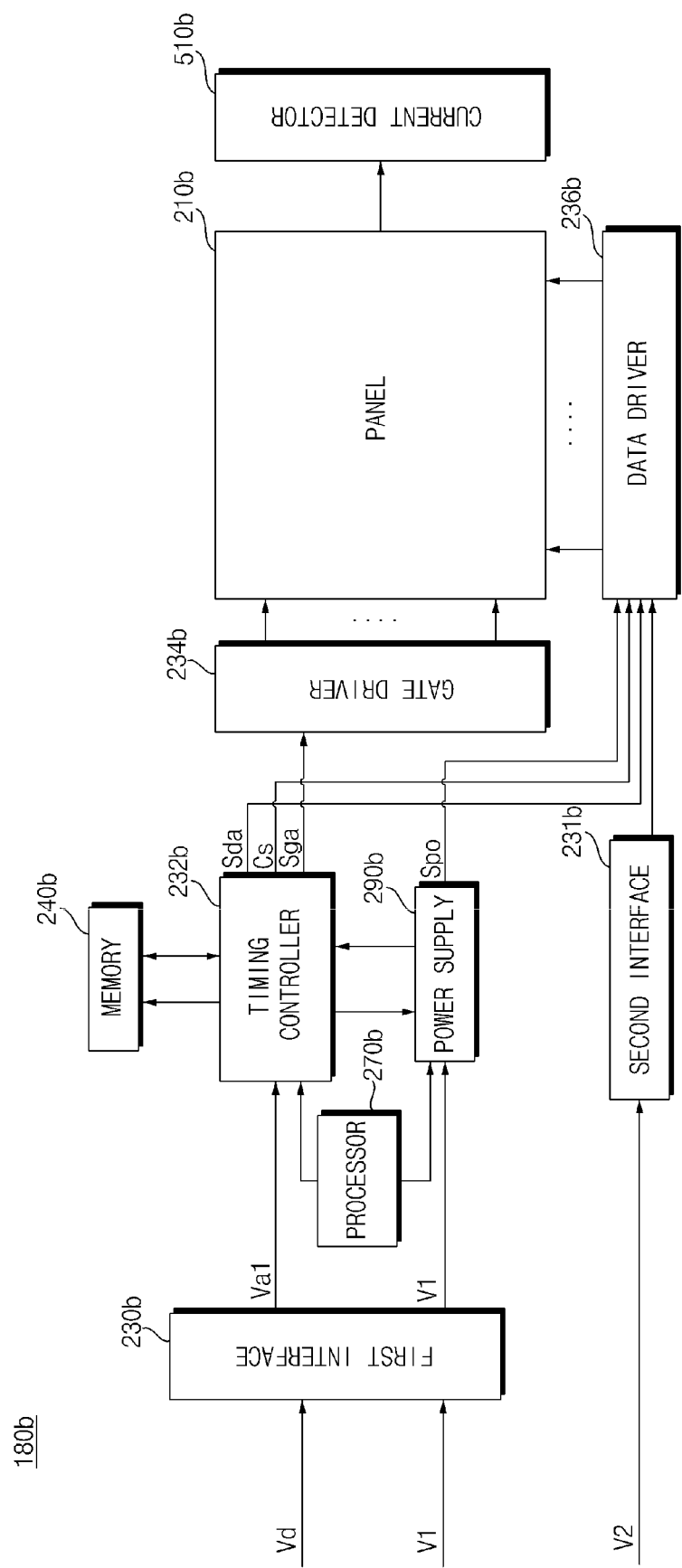
FIG. 17 is another example of an internal block diagram of a display of FIG. 2.

FIG. 17 is another example of an internal block diagram of the display of FIG. 2.

Referring to the figure, an organic light emitting diode panel-based display 180b may include an organic light emitting diode panel 210b, a first interface 230b, a second interface 231b, a timing controller 232b, a gate driver 234b, a data driver 236b, a memory 240b, a processor 270b, a power supply 290b, and a current detector 510b.

The display 180b receives an image signal Vdb, first DC voltage V1b, and second DC voltage V2b, and may display a predetermined image based on the image signal Vdb.

Meanwhile, the first interface 230b in the display 180b may receive the image signal Vdb and the first DC voltage V1b from the signal processing device 170b.

Here, the first DC voltage V1b may be used for the operation of the power supply 290b and the timing controller 232b in the display 180b.

Next, the second interface 231b may receive second DC voltage V2b from an external power supply 190b. Meanwhile, the second DC voltage V2b may be input to the data driver 236b in the display 180b.

The timing controller 232b may output a data driving signal Sdab and a gate driving signal Sgab based on the image signal Vdb.

For example, when the first interface 230b converts the input image signal Vdb and outputs the converted image signal valb, the timing controller 232b may output the data driving signal Sdab and the gate driving signal Sgab based on the converted image signal valb.

The timing controller 232b may further receive a control signal, a vertical synchronization signal Vsyncb, and the like, in addition to the image signal Vdb from the signal processing device 170b.

The timing controller 232b generates a gate driving signal Sgab for the operation of the gate driver 234b and a data driving signal Sdab for the operation of the data driver 236b based on the control signal, the vertical synchronization signal Vsyncb, and the like, in addition to the image signal Vdb.

At this time, when the panel 210b includes RGBW subpixels, the data driving signal Sdab may be a data driving signal for driving of the RGBW subpixels.

Meanwhile, the timing controller 232b may further output a control signal Csb to the gate driver 234b.

The gate driver 234b and the data driver 236b supply a scan signal and an image signal to the organic light emitting diode panel 210b through gate lines GLb and data lines DLb, respectively, according to the gate driving signal Sgab and the data driving signal Sdab from the timing controller 232b. Accordingly, the organic light emitting diode panel 210b displays a predetermined image.

Meanwhile, the organic light emitting diode panel 210b may include an organic light emitting layer. In order to display an image, a plurality of gate lines GL and data lines DL may be disposed so as to intersect each other in a matrix form at each pixel corresponding to the organic light emitting layer.

Meanwhile, the data driver 236b may output a data signal to the organic light emitting diode panel 210b based on second DC voltage V2b from the second interface 231b.

The power supply 290b may supply various kinds of power to the gate driver 234b, the data driver 236b, the timing controller 232b, and the like.

The current detector 510b may detect the current flowing in a sub-pixel of the organic light emitting diode panel 210b. The detected current may be input to the processor 270b or the like for cumulative current calculation.

The processor 270b may perform various kinds of control in the display 180b. For example, the processor 270b may control the gate driver 234b, the data driver 236b, the timing controller 232b, and the like.

Meanwhile, the processor 270b may receive current information flowing in a sub-pixel of the organic light emitting diode panel 210b from the current detector 510b.

Figure 18A:
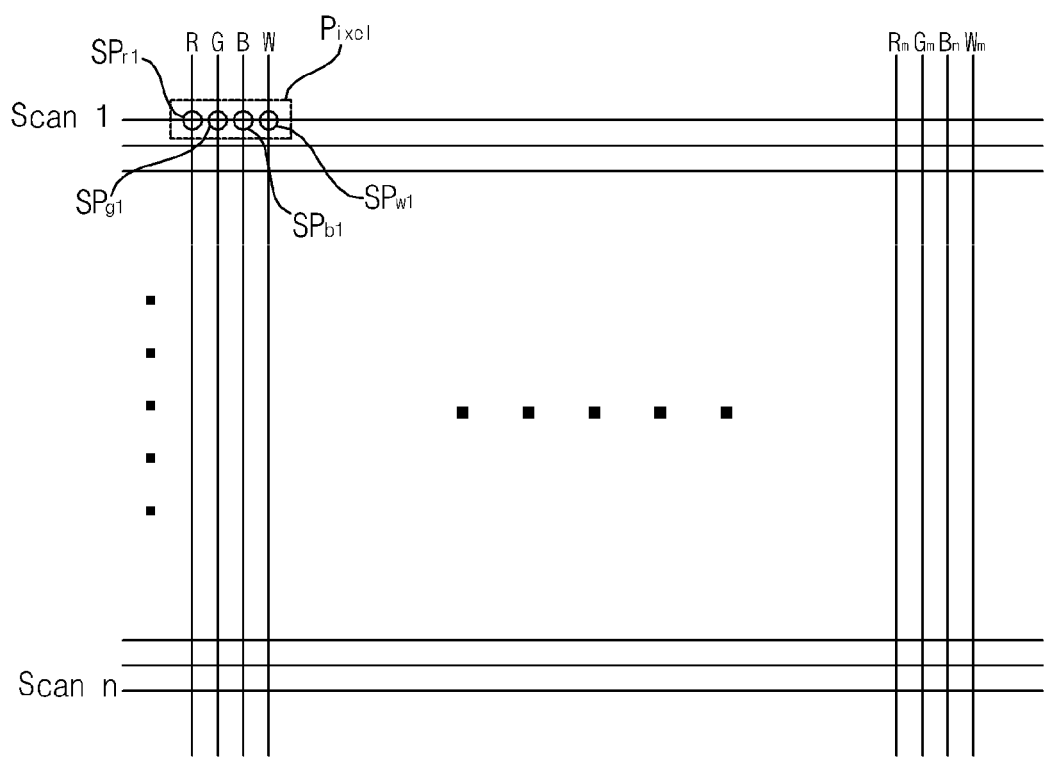
FIGS. 18A and 18B are diagrams referred to in the description of an organic light emitting diode panel of FIG. 17.
Figure 18B:
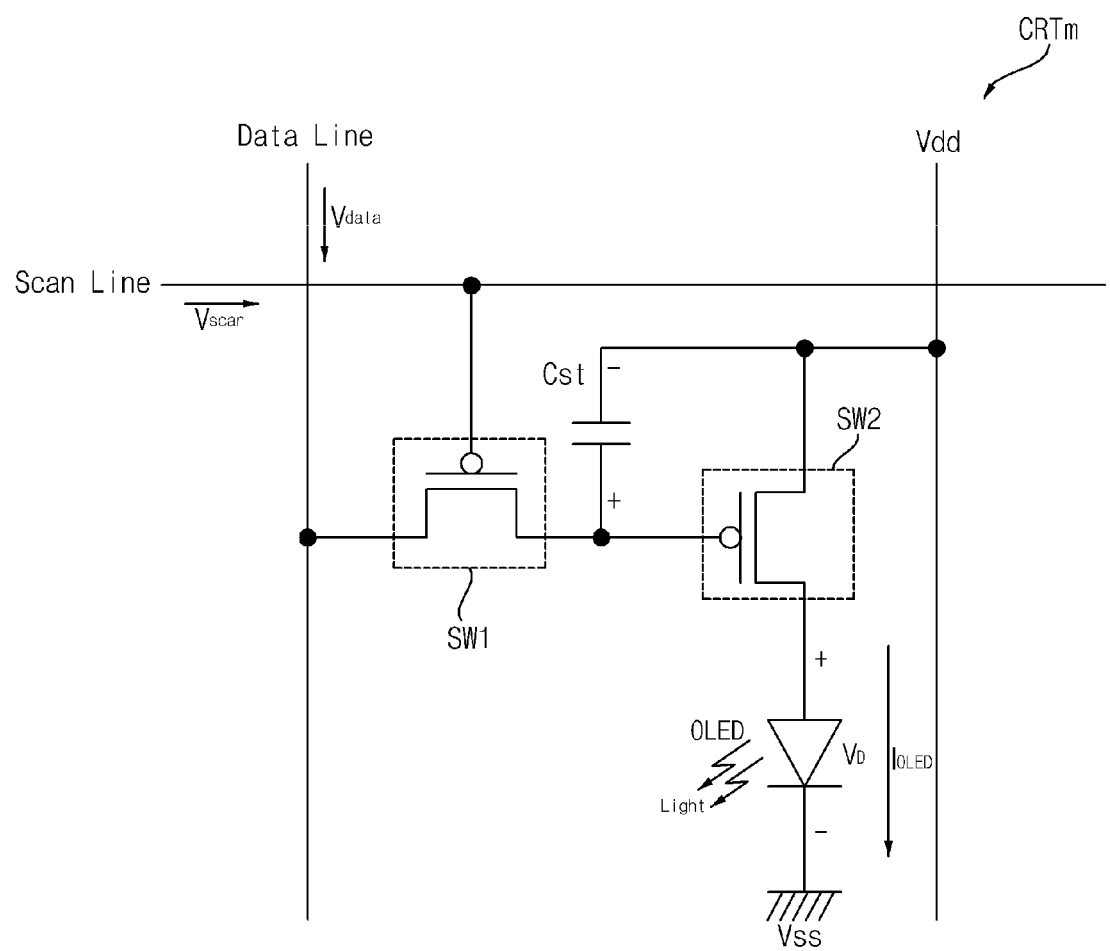

FIGS. 18A and 18B are diagrams referred to in the description of the organic light emitting diode panel of FIG. 17.

First, FIG. 18A is a diagram illustrating a pixel in the organic light emitting diode panel 210b.

Referring to the figure, the organic light emitting diode panel 210b may include a plurality of scan lines Scan1 to Scann and a plurality of data lines R1, G1, B1, and W1 to Rm, Gm, Bm, and Wm intersecting the scan lines.

Meanwhile, a pixel (subpixel) is defined in an intersecting area of the scan line and the data line in the organic light emitting diode panel 210b. In the drawing, a pixel including sub-pixels SR1, SG1, SB1 and SW1 of RGBW is shown.

FIG. 18B illustrates a circuit of any one sub-pixel in the pixel of the organic light emitting diode panel of FIG. 18A.

Referring to the drawing, an organic light emitting sub pixel circuit (CRTm) may include, as an active type, a scan switching element SW1, a storage dc link capacitor Cst, a drive switching element SW2, and an organic light emitting layer (OLED).

The scan switching element SW1 is turned on according to an input scan signal Vdscan, as a scan line is connected to a gate terminal. When it is turned on, the input data signal Vdata is transmitted to the gate terminal of the drive switching element SW2 or to one end of the storage dc link capacitor Cst.

The storage dc link capacitor Cst is formed between the gate terminal and the source terminal of the drive switching element SW2, and stores a predetermined difference between a level of the data signal, transmitted to one end of the storage dc link capacitor Cst, and a level of the DC voltage (Vdd) transmitted to another end of the storage dc link capacitor Cst.

For example, when the data signal has different levels according to a Plume Amplitude Modulation (PAM) method, the level of power stored in the storage dc link capacitor Cst varies depending on a difference in levels of the data signal Vdata.

In another example, when the data signal has different pulse widths according to a Pulse Width Modulation (PWM) method, the level of power stored in the storage dc link capacitor Cst varies depending on a difference in pulse widths of the data signal Vdata.

The drive switching element SW2 is turned on according to the level of power stored in the storage dc link capacitor Cst. When the drive switching element SW2 is turned on, the driving current IOLED, which is proportional to the level of the stored power, flows in the organic light emitting layer OLED, thereby allowing the organic light emitting layer OLED to perform a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made herein without departing from the subject matter and scope of the present disclosure.

What is claimed is:

1. An image display apparatus comprising:
    a display; and
    a power supply configured to supply a driving voltage to the display,
    wherein the power supply comprises:
    an AC/DC converter comprising at least one switching device and configured to convert an input AC voltage into a DC voltage and output the DC voltage to a dc link;
    a dc link capacitor disposed at the dc link;
    an input voltage detector configured to detect the input AC voltage;
    a dc link voltage detector configured to detect a dc link voltage at the dc link; and
    a controller configured to control the AC/DC converter,
    wherein in response to the detected input AC voltage exceeding a first reference value and the detected dc link voltage being lower than or equal to a second reference value, which is lower than the first reference value, the controller is configured to turn off the switching device in the AC/DC converter,
    wherein the input voltage detector comprises:
    a first resistor having one end connected between the input AC voltage and the AC/DC converter; and
    a second resistor having one end connected to another end of the first resistor, and having another end connected to a ground terminal, and
    wherein a voltage at both ends of the second resistor is input to the controller.

2. The image display apparatus of claim 1, wherein in response to the detected input AC voltage exceeding the first reference value and the detected dc link voltage exceeding the second reference value, the controller is configured to perform a switching operation of the switching device in the AC/DC converter.

3. The image display apparatus of claim 1, wherein in response to the detected input AC voltage being lower than or equal to the first reference value, the controller is configured to turn off the switching device in the AC/DC converter.

4. The image display apparatus of claim 1, wherein after being powered on and before operation of the switching device in the AC/DC converter, the controller is configured to determine whether the detected dc link voltage is lower than or equal to the second reference value, and in response to the detected dc link voltage being lower than or equal to the second reference value, the controller is configured to stop the AC/DC converter.

5. The image display apparatus of claim 1, wherein after being powered on and before operation of the switching device in the AC/DC converter, the controller is configured to determine whether the detected input AC voltage is lower than or equal to the first reference value, and when the detected input AC voltage is lower than or equal to the first reference value, the controller is configured to stop the AC/DC converter.

6. The image display apparatus of claim 1, wherein the AC/DC converter comprises:
    a first leg comprising a first diode and a first switching device which are connected in series to each other; and
    a second leg comprising a second diode and a second switching device which are connected in series to each other and connected in parallel to the first leg.

7. The image display apparatus of claim 6, wherein after being powered on and before operation of the first switching device and the second switching device, the controller is configured to determine whether the detected dc link voltage is lower than or equal to the second reference value, and when the detected dc link voltage is lower than or equal to the second reference value, the controller is configured to stop the AC/DC converter.

8. The image display apparatus of claim 1, wherein the dc link voltage detector comprises:
    a third resistor having one end connected to one end of the dc link;
    a fourth resistor having one end connected to another end of the third resistor, and having another end connected to a ground terminal; and
    a capacitor connected in parallel to both ends of the fourth resistor,
    wherein a voltage at both ends of the fourth resistor is input to the controller.

9. The image display apparatus of claim 1, wherein when the dc link voltage continuously increases in a state in which a voltage detected by the dc link voltage detector is lower than or equal to the second reference value, the controller is configured to decrease the dc link voltage by turning off the AC/DC converter.

10. The image display apparatus of claim 1, wherein in response to a voltage detected by the dc link voltage detector exceeding the second reference value, the controller is configured to increase the dc link voltage to a target voltage, and after the dc link voltage reaches the target voltage, the controller is configured to control the dc link voltage to maintain the target voltage.

11. The image display apparatus of claim 1, wherein the display comprises a liquid crystal panel.

12. The image display apparatus of claim 1, wherein the display comprises an organic light emitting diode panel.

13. An image display apparatus comprising:
a display; and
a power supply configured to supply a driving voltage to the display,
wherein the power supply comprises:
an AC/DC converter comprising at least one switching device and configured to convert an input AC voltage into a DC voltage and output the DC voltage to a dc link;
a dc link capacitor disposed at the dc link;
an input voltage detector configured to detect the input AC voltage;
a dc link voltage detector configured to detect a dc link voltage at the dc link;
a controller configured to control the AC/DC converter;
a first DC/DC converter configured to convert a level of the dc link voltage and to supply the dc link voltage having the converted level to the controller; and
a second DC/DC converter configured to convert a level of the dc link voltage and supply the driving voltage to the display,
wherein in response to the detected input AC voltage exceeding a first reference value and the detected dc link voltage being lower than or equal to a second reference value, which is lower than the first reference value, the controller is configured to turn off the switching device in the AC/DC converter.

14. An image display apparatus comprising:
a display; and
a power supply configured to supply a driving voltage to the display,
wherein the power supply comprises:
an AC/DC converter comprising at least one switching device and configured to convert an input AC voltage into a DC voltage and output the DC voltage to a dc link;
a dc link capacitor disposed at the dc link;
a dc link voltage detector configured to detect a dc link voltage at the dc link; and
a controller configured to control the AC/DC converter,
wherein after being powered on and before operation of the switching device in the AC/DC converter, the controller is configured to determine whether the detected dc link voltage is lower than or equal to a reference value, and when the detected dc link voltage is lower than or equal to the reference value, the controller is configured to stop the AC/DC converter, and
wherein in response to a voltage detected by the dc link voltage detector exceeding the reference value, the controller is configured to increase the dc link voltage to a target voltage, and after the dc link voltage reaches the target voltage, the controller is configured to control the dc link voltage to maintain the target voltage.

15. The image display apparatus of claim 14, wherein when the dc link voltage continuously increases in a state that a voltage detected by the dc link voltage detector is lower than or equal to the reference value, the controller is configured to decrease the dc link voltage by turning off the AC/DC converter.

* * * * *